US012597357B2

(12) United States Patent
Shyman et al.

(10) Patent No.: US 12,597,357 B2
(45) Date of Patent: Apr. 7, 2026

(54) AUTOMATIC AIRCRAFT TAXIING

(71) Applicant: Joby Aero, Inc., Santa Cruz, CA (US)

(72) Inventors: Oleksii Shyman, Martinez, CA (US); Edward Lim, Pacifica, CA (US); Maxime Gariel, San Francisco, CA (US); Joshua Rosenkranz, San Francisco, CA (US); Craig Milliard, Vallejo, CA (US); Ryan Olson, San Francisco, CA (US); Sui Nam Chan, Sacramento, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 703 days.

(21) Appl. No.: 17/900,963

(22) Filed: Sep. 1, 2022

(65) Prior Publication Data

US 2023/0076554 A1 Mar. 9, 2023

Related U.S. Application Data

(60) Provisional application No. 63/298,422, filed on Jan. 11, 2022, provisional application No. 63/240,554, filed on Sep. 3, 2021.

(51) Int. Cl.
*G08G 5/51* (2025.01)
*G08G 5/22* (2025.01)
*G08G 5/26* (2025.01)

(52) U.S. Cl.
CPC .................................... *G08G 5/51* (2025.01)

(58) Field of Classification Search
CPC ............... G08G 5/51; G08G 5/22; G08G 5/26
(Continued)

(56) References Cited

U.S. PATENT DOCUMENTS 3,035,789 A 5/1962 Young
4,022,405 A 5/1977 Peterson
(Continued)

FOREIGN PATENT DOCUMENTS

EP 0945841 A1 9/1999
EP 2698749 A1 2/2014
(Continued)

OTHER PUBLICATIONS

Dijkstra's Algorithm Wikipedia page. Page is dated Feb. 25, 2021. Page was accessed on Dec. 13, 2022 at the following URL: https://web.archive.org/web/20210225155544/https://en.wikipedia.org/wiki/Dijkstra's_algorithm.
(Continued)

*Primary Examiner* — Tyler D Paige
(74) *Attorney, Agent, or Firm* — Dority & Manning, P.A.

(57) ABSTRACT

A non-transitory computer-readable medium includes computer-executable instructions that cause one or more processing units to acquire an airport map that includes a plurality of edge data structures. Each of the edge data structures includes a plurality of waypoints and membership data that indicates a location at an airport. The instructions further cause the one or more processing units to receive a starting location and a starting heading of an aircraft at the airport, determine a destination location and a destination heading for the aircraft at the airport, and generate a taxiing path plan for the aircraft based on the airport map, the starting location, the starting heading, the destination location, and the destination heading. The taxiing path plan includes a sequence of waypoints from the edge data structures. The instructions further cause the one or more processing units to send the taxiing path plan to the aircraft.

24 Claims, 18 Drawing Sheets

(58) Field of Classification Search
USPC .......................................................... 701/120
See application file for complete search history.

(56) References Cited

U.S. PATENT DOCUMENTS

| | | | |
|---|---|---|---|
| 5,823,468 | A | 10/1998 | Bothe |
| 5,839,691 | A | 11/1998 | Lariviere |
| 5,842,667 | A | 12/1998 | Jones |
| 6,343,127 | B1 | 1/2002 | Billoud |
| 6,892,980 | B2 | 5/2005 | Kawai |
| 8,016,226 | B1 | 9/2011 | Wood |
| 8,020,804 | B2 | 9/2011 | Yoeli |
| 8,311,686 | B2 | 11/2012 | Herkes et al. |
| 8,733,690 | B2 | 5/2014 | Bevirt et al. |
| 8,737,634 | B2 | 5/2014 | Brown et al. |
| 8,849,479 | B2 | 9/2014 | Walter |
| 9,205,930 | B2 | 12/2015 | Yanagawa |
| 9,387,928 | B1 | 7/2016 | Gentry et al. |
| 9,415,870 | B1 | 8/2016 | Beckman et al. |
| 9,422,055 | B1 | 8/2016 | Beckman et al. |
| 9,435,661 | B2 | 9/2016 | Brenner et al. |
| 9,442,496 | B1 | 9/2016 | Beckman et al. |
| 9,487,304 | B1 * | 11/2016 | Bowen .................. B64D 43/00 |
| 9,550,561 | B1 | 1/2017 | Beckman et al. |
| 9,663,237 | B2 | 5/2017 | Senkel et al. |
| 9,694,911 | B2 | 7/2017 | Bevirt et al. |
| 9,771,157 | B2 | 9/2017 | Gagne et al. |
| 9,786,961 | B2 | 10/2017 | Dyer et al. |
| 9,802,702 | B1 | 10/2017 | Beckman et al. |
| 9,816,529 | B2 | 11/2017 | Grissom et al. |
| 9,838,436 | B2 | 12/2017 | Michaels |
| 10,140,873 | B2 | 11/2018 | Adler et al. |
| 10,152,894 | B2 | 12/2018 | Adler et al. |
| 10,216,190 | B2 | 2/2019 | Bostick et al. |
| 10,249,200 | B1 | 4/2019 | Grenier et al. |
| 10,304,344 | B2 | 5/2019 | Moravek et al. |
| 10,330,482 | B2 | 6/2019 | Chen et al. |
| 10,593,215 | B2 | 3/2020 | Villa |
| 10,593,217 | B2 | 3/2020 | Shannon |
| 10,752,365 | B2 | 8/2020 | Galzin |
| 10,759,537 | B2 | 9/2020 | Moore et al. |
| 10,768,201 | B2 | 9/2020 | Luo et al. |
| 10,832,581 | B2 | 11/2020 | Westervelt et al. |
| 10,836,470 | B2 | 11/2020 | Liu et al. |
| 10,913,528 | B1 | 2/2021 | Moore et al. |
| 10,948,910 | B2 | 3/2021 | Taveira et al. |
| 10,960,785 | B2 | 3/2021 | Villanueva et al. |
| 11,130,566 | B2 | 9/2021 | Mikic et al. |
| 11,145,211 | B2 | 10/2021 | Goel et al. |
| 11,238,745 | B2 | 2/2022 | Villa et al. |
| 11,295,622 | B2 | 4/2022 | Goel et al. |
| 2010/0079342 | A1 | 4/2010 | Smith et al. |
| 2014/0179535 | A1 | 6/2014 | Stückl et al. |
| 2016/0311529 | A1 | 10/2016 | Brotherton-Ratcliffe et al. |
| 2017/0197710 | A1 | 7/2017 | Ma |
| 2017/0357914 | A1 | 12/2017 | Tulabandbula et al. |
| 2018/0018887 | A1 | 1/2018 | Sharma et al. |
| 2018/0053425 | A1 | 2/2018 | Adler et al. |
| 2018/0216988 | A1 | 8/2018 | Nance |
| 2018/0308366 | A1 | 10/2018 | Goel et al. |
| 2018/0354636 | A1 | 12/2018 | Darnell et al. |
| 2019/0146508 | A1 | 5/2019 | Dean et al. |
| 2019/0221127 | A1 | 7/2019 | Shannon |
| 2019/0316849 | A1 | 10/2019 | Abrego et al. |
| 2020/0103922 | A1 | 4/2020 | Nonami et al. |
| 2020/0182637 | A1 | 6/2020 | Kumar et al. |
| 2020/0273345 | A1 * | 8/2020 | Mangal .................. G06Q 50/40 |
| 2020/0388166 | A1 | 12/2020 | Rostamzadeh et al. |
| 2021/0104164 | A1 * | 4/2021 | Erignac .................... G08G 5/51 |

FOREIGN PATENT DOCUMENTS

| | | | |
|---|---|---|---|
| EP | 3499634 | A1 | 6/2019 |
| JP | 2010095246 | A | 4/2010 |
| JP | 2013086795 | A | 5/2013 |
| WO | WO 2018023556 | A1 | 2/2018 |
| WO | WO 2019089677 | A1 | 5/2019 |
| WO | WO 2020252024 | A1 | 12/2020 |

OTHER PUBLICATIONS

Directed Graph Wikipedia page. Page is dated Feb. 11, 2021. Page was accessed on Dec. 13, 2022 at the following URL: https://web.archive.org/web/20210211013457/https://en.wikipedia.org/wiki/Directed_graph.

World-wide Precision Airport Mapping Databases for Aviation Applications. Published in: Digital Avionics Systems Conference, 2003. DASC '03. The 22nd. Date of Conference: Oct. 12-16, 2003.

Bennaceur et al., "Passenger-centric urban air mobility: Fairness trade-offs and operational efficiency", Transportation Research: Emerging Technologies, 2021, 29 pages.

Jong, "Optimizing cost effectiveness and flexibility of air taxis: A case study for optimization of air taxi operations", University of Twente, Master's thesis, 2007, 62 pages.

Miao et al., "Data-driven robust taxi dispatch under demand uncertainties", IEEE Transactions on Control Systems Technology 27, No. 1, 2017, 16 pages.

Miao et al., "Taxi dispatch with real-time sensing data in metropolitan areas: A receding horizon control approach", in Proceedings of the ACM/IEEE Sixth International Conference on Cyber-Physical Systems, 2015, 15 pages.

Uber, "Fast-forwarding to a future of on-demand urban air transportation", 2016, 99 pages.

* cited by examiner

```yaml
- active: true
  points: [KCCRG__B021, KCCRG__B020]
  stop_points:
      KCCRG__B008:
          stop_point_type: hold_short
          heading: 330
      KCCRG__B009:
          stop_point_type: hold_short
          heading: 150
```

FIG. 7

```yaml
01R:
    start_taxipoint_id: KCCRG01R013
    start_heading: 10
    destination_taxipoint_id: KCCRG01R002
    destination_heading: 10
```

FIG. 8

AUTOMATIC AIRCRAFT TAXIING

CROSS-REFERENCE TO RELATED APPLICATION

This application claims the benefit of U.S. Provisional Application No. 63/240,554, filed on Sep. 3, 2021 and U.S. Provisional Application No. 63/298,422, filed on Jan. 11, 2022. The disclosures of the above applications are incorporated herein by reference in their entirety.

FIELD

The present disclosure relates to aircraft taxiing.

BACKGROUND

An airplane uses taxiways to taxi from one place to another at an airport. For example, prior to takeoff, an aircraft may move to a takeoff location from an aircraft hanger, cargo/passenger pickup location, or other location via airport taxiways. As another example, after landing, an aircraft may taxi to a passenger/cargo drop-off location via airport taxiways. In some implementations, aircraft movement around airports may be orchestrated by air traffic control (ATC). For example, ATC may specify a runway and issue taxi instructions/clearances. At a non-towered airport, other procedures and best practices may be followed, such as yielding the right-of-way and providing radio announcements to others regarding aircraft movements.

SUMMARY

In one example, a non-transitory computer-readable medium comprises computer-executable instructions, the computer-executable instructions causing one or more processing units of a computing device to acquire an airport map that includes a plurality of edge data structures. Each of the edge data structures includes a plurality of waypoints and membership data that indicates a location at an airport. The instructions further cause the one or more processing units to receive a starting location and a starting heading of an aircraft at the airport, determine a destination location and a destination heading for the aircraft at the airport, and generate a taxiing path plan for the aircraft based on the airport map, the starting location, the starting heading, the destination location, and the destination heading. The taxiing path plan includes a sequence of waypoints from the edge data structures. The instructions further cause the one or more processing units to send the taxiing path plan to the aircraft.

In one example, a non-transitory computer-readable medium comprises computer-executable instructions, the computer-executable instructions causing one or more processing units of an aircraft to acquire an airport map that includes a plurality of edge data structures. Each of the edge data structures includes a plurality of waypoints and membership data that indicates a location at an airport. The instructions further cause the one or more processing units to receive a starting location and a starting heading of the aircraft at the airport, determine a destination location and a destination heading for the aircraft at the airport, and generate a taxiing path plan for the aircraft based on the airport map, the starting location, the starting heading, the destination location, and the destination heading. The taxiing path plan includes a sequence of waypoints from the edge data structures. The instructions further cause the one or more processing units to execute the taxiing path plan by following the sequence of waypoints in the taxiing path plan.

BRIEF DESCRIPTION OF THE DRAWINGS

The present disclosure will become more fully understood from the detailed description and the accompanying drawings.

FIG. 7 illustrates an example edge in an airport map file.

FIG. 8 illustrates an example alias for runway 01R in an airport map.

In the drawings, reference numbers may be reused to identify similar and/or identical elements.

DETAILED DESCRIPTION

Figure 1:
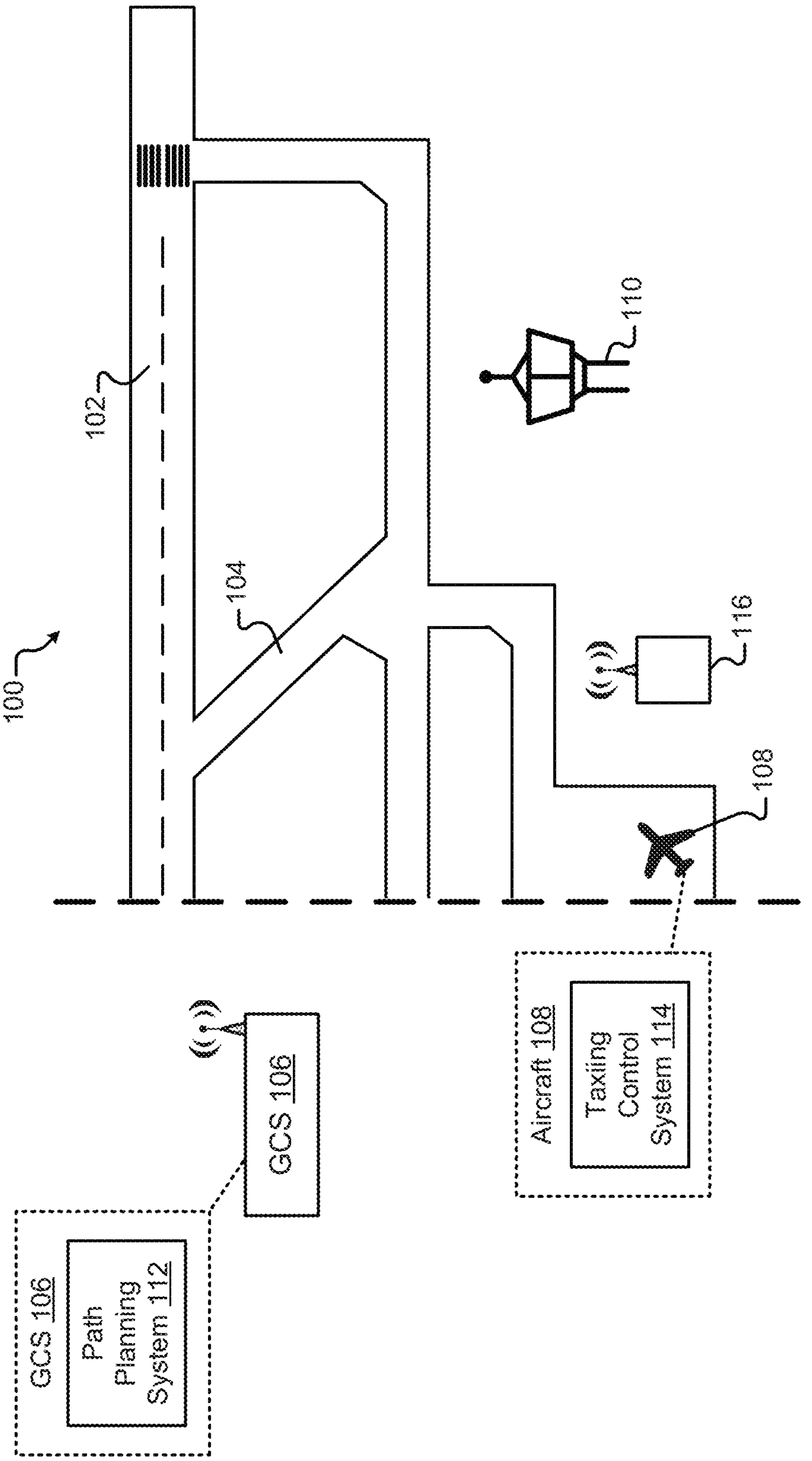
FIG. 1 illustrates an example environment that includes a partial airport, a ground control station (GCS), an aircraft, and an air traffic control (ATC) tower.

FIG. 1 illustrates an example environment that includes: 1) a partial airport 100 (e.g., an airport runway 102, taxiway 104, and other roads/surfaces), 2) a ground control station 106 (GCS 106), 3) an aircraft 108 (e.g., a manned or unmanned aircraft), and 4) an air traffic control (ATC) tower 110. The GCS 106 may include systems/devices (e.g., a path planning system 112) that generate a taxiing path plan for the aircraft 108. The aircraft 108 may include an aircraft control system (e.g., a taxiing control system 114) that controls the aircraft 108 according to the generated taxiing path plan, such that the aircraft 108 may automatically traverse the generated taxiing path plan without additional operator intervention. In some implementations, the taxiing path plan may include a list of coordinates and other data for the aircraft autopilot (e.g., auto-taxiing features of the autopilot system).

FIG. 1 illustrates an example portion of an airport 100 including a runway 102, taxiway 104, and other airport topology. The airport 100 illustrated in FIG. 1 is a simplified airport illustration. As such, airports may include additional features, such as additional runways, paths, and markings, some of which are described herein. An airport may have multiple possible paths between two points, depending on airport topology. The path planning system 112 may find a path through different airport topologies based on ATC instructions and/or other path planning operations described herein (e.g., a shortest path for non-towered airports). Example starting/destination locations for a taxiing path plan may include, but are not limited to, a hangar, parking, other aircraft storage, cargo pickup/drop-off locations, and/or passenger pickup/drop-off locations.

The GCS 106 can communicate with the aircraft 108 and ATC 110 in a variety of manners (e.g., radio, cellular, Internet, etc.). In some implementations, the GCS 106, including a human operator, may be located at the same airport as the aircraft and ATC. In these implementations, the GCS may include communication systems that communicate with the aircraft and ATC locally. In other implementations, the GCS 106 may be located at a different airport, or other location, that is remote from the aircraft and ATC (e.g., as illustrated in FIG. 1). In these implementations, the GCS 106 may remotely communicate with the aircraft and ATC. In some implementations, an airport, or other nearby location, may include a communication base station 116 that communicates locally with the aircraft and ATC (e.g., as illustrated in FIG. 1). In these implementations, the GCS 106 may communicate with the remote communication base station 116 that in turn communicates locally with the aircraft 108 and ATC 110. The GCS 106, communication base station 116, aircraft 108, and ATC 110 may also communicate via other pathways. For example, the GCS 106 may communicate with the ATC 110 via the aircraft 108 (e.g., using the aircraft 108 as a communication relay).

In some implementations, a remote operator (e.g., a remote pilot) in the GCS 106 may monitor/control the aircraft 108. For example, a remote operator (e.g., a remote pilot) in the GCS 106 may send a taxiing path plan to the aircraft and monitor/control execution of the taxiing path plan. As another example, the remote operator in the GCS 106 may send flight plans/commands to the aircraft 108 and receive data from the aircraft 108 and other sources during flight. In some cases, the GCS 106 may be referred to as an aircraft operations center (AOC). In some cases, the remote operator may be referred to as a remote pilot, depending on the operator's qualifications and responsibilities.

Figure 2:
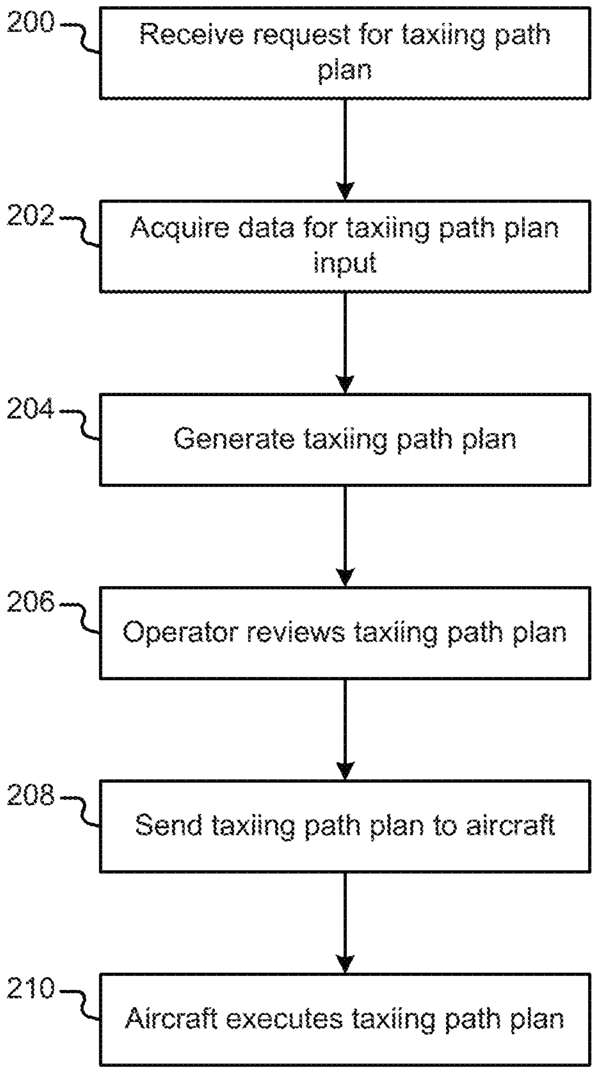
FIG. 2 is an example method that describes operation of the environment of FIG. 1.
Figure 3:
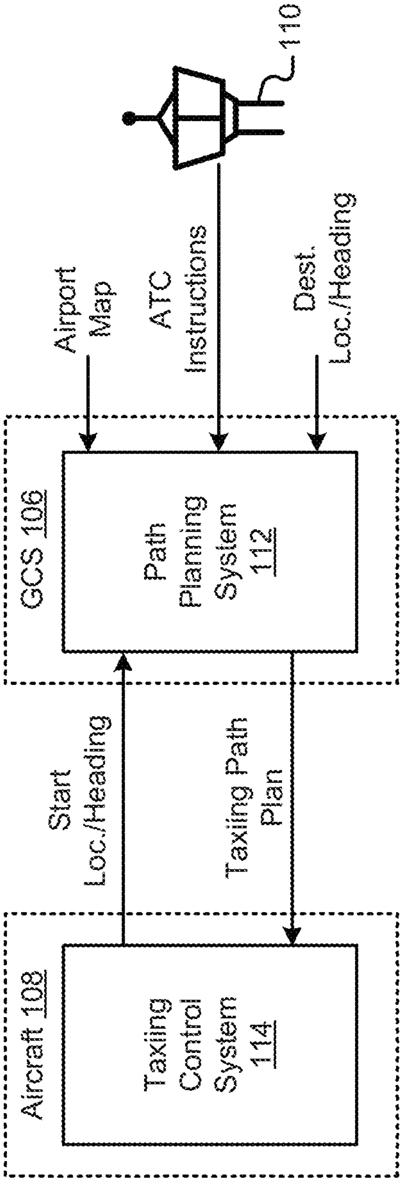
FIG. 3 is a functional block diagram that illustrates example data and communications between systems/devices of FIG. 1.

FIG. 2 is an example method that describes operation of the environment of FIG. 1. FIG. 3 is a functional block diagram that illustrates example data and communications between systems/devices of FIG. 1. In some implementations, the method of FIG. 2 may be initiated in response to an operator's request (e.g., at the GCS 106) to the path planning system 112. The path planning system 112 that receives the operator request may include one or more computing devices, such as desktop/laptop computing devices, mobile computing devices (e.g., smartphones, tablets, etc.), and/or server computing devices. Although an operator may make a request for the taxiing path plan, in other implementations, the taxiing path plan may be generated automatically in response to other triggers (e.g., aircraft location, aircraft startup, etc.).

The path planning system 112 may generate a taxiing path plan (hereinafter "taxiing plan") at any time prior to taxiing. For example, the path planning system 112 may generate a taxiing plan at any time prior to taxiing for takeoff. As another example, the path planning system 112 may generate a taxiing plan for use after landing at any point before taxiing after landing, such as during landing, during flight, or prior to takeoff. The path planning system 112 may also recalculate the taxiing plan in response to additional requests and/or changing conditions at any time, even while taxiing according to a current taxiing plan.

Although the path planning system 112 may generate the taxiing plan at the GCS 106 (e.g., according to the method of FIG. 2), in other implementations, the path planning system 112 may be implemented in other locations. For example, an aircraft (e.g., manned or unmanned aircraft) may include a path planning system (e.g., taxi modules 1424 of FIG. 14B), or components of the path planning system 112, that generate the taxiing plan. As such, the extent to which the features of the path planning system 112 are implemented on the aircraft 108 and/or GCS 106 may vary, depending on the implementation.

Referring to FIG. 2, in block 200, the path planning system 112 receives a request for a taxiing plan. In block 202, the path planning system 112 acquires data for generating the taxiing plan. Example input data for the path planning system 112 may include, but is not limited to, a starting location of the aircraft 108, a starting orientation/heading for the aircraft 108, an airport map, ATC instructions, a destination location for the aircraft 108, and a destination orientation/heading for the aircraft 108.

The data acquired in block 202 may be acquired from a variety of different sources. In some implementations, the starting location/heading of the aircraft 108 may be determined by onboard sensors included on the aircraft 108. The aircraft 108 may transmit the starting location/heading to the GCS 106. The airport map may be stored in a data store at the path planning system 112 and/or acquired from another data store that provides airport maps. In some implementations, the path planning system 112 may translate received maps into a proper format for use in generating a taxiing plan. In some implementations, maps may include preset points from which a taxiing plan is selected. In some implementations, points may be generated dynamically. If the airport 100 includes an ATC 110, the ATC instructions may be received from the ATC 110. In some implementations, the ATC instructions may be manually entered by a human operator. In other implementations, the received ATC instructions may be input automatically using speech recognition (e.g., speech-to-text).

The protocols used for communication between the aircraft 108, GCS 106, and ATC 110 may vary, depending on the implementation. In some implementations, the GCS 106 and/or aircraft 108 may be configured to parse voice instructions from ATC 110 (e.g., using a computing device implementing voice recognition). The GCS 106 and/or aircraft 108 may generate the taxiing plan based on the parsed voice instructions. In some implementations, the GCS 106 and/or aircraft 108 may also communicate with ATC 110 via voice. For example, the aircraft 108 may generate digital voice data using a computing device implementing text-to-speech. The aircraft 108 may then transmit the voice via VHF radio to ATC 110. In one example, the aircraft 108 may automatically request ATC instructions via voice (e.g., a computer-generated voice). Additionally, the aircraft 108 may automatically confirm received instructions to ATC 110 via voice (e.g., a computer-generated voice). In some implementations, a human operator at the GCS 106 may monitor and/or modify the communications between the aircraft 108 and ATC 110. In other implementations, the automated communications may not be monitored at the GCS 106.

In some implementations, a human operator at the GCS 106 may verbally communicate with ATC 110. For example, a human operator may communicate directly with ATC 110 via a VHF radio and/or voice data connection. As another example, a human operator may communicate with ATC 110 via radio and/or voice data using a communication base station 116 as a relay. As another example, a human operator may communicate with ATC 110 via radio and/or voice data using the aircraft communication system 1412 as a relay.

In block 204, the path planning system 112 generates the taxiing plan. As described herein, the path planning system 112 may generate the taxiing plan based on ATC instructions and/or using other path planning algorithms (e.g., a shortest path algorithm). In cases where the path planning system 112 is unable to determine a path, the path planning system 112 may return one or more errors. In block 206, the operator (e.g., at the GCS 106 or in the aircraft 108) may review the taxiing plan (e.g., on a taxiing plan GUI). In some implementations, the operator may modify the taxiing plan and/or request a new taxiing plan. In block 208, the GCS 106 sends the taxiing plan to the aircraft 108. In block 210, the aircraft 108 (e.g., taxiing control system 114) may execute the taxiing plan by controlling the aircraft 108 according to the taxiing plan.

The path planning system 112 may store and/or retrieve an airport map for the airport 100. The airport map may include an airport map data structure that defines the topology of the airport. In some implementations, the path planning system 112 may update the airport maps over time (e.g., in response to changes in the airport topology and/or temporary construction).

In some implementations, an airport map data structure may include point data structures (e.g., waypoint data structures) that define different locations in the airport 100. For example, airport point data structures may include point IDs and geometry information. In one example, airport point data structures may include a name, latitude, longitude, and altitude values. In some implementations, point IDs may be generated according to a naming convention. The path planning system 112 may generate taxiing plans from one point in the airport map to another point. In some implementations, the path planning system 112 and taxiing control system 114 may operate according to a variety of assumptions regarding map generation, taxi planning, and control. For example, the path planning system 112 and the taxiing control system 114 may generate and traverse taxiing plans in which the path is along a centerline of a road and may not include undriveable terrain.

Figure 4:
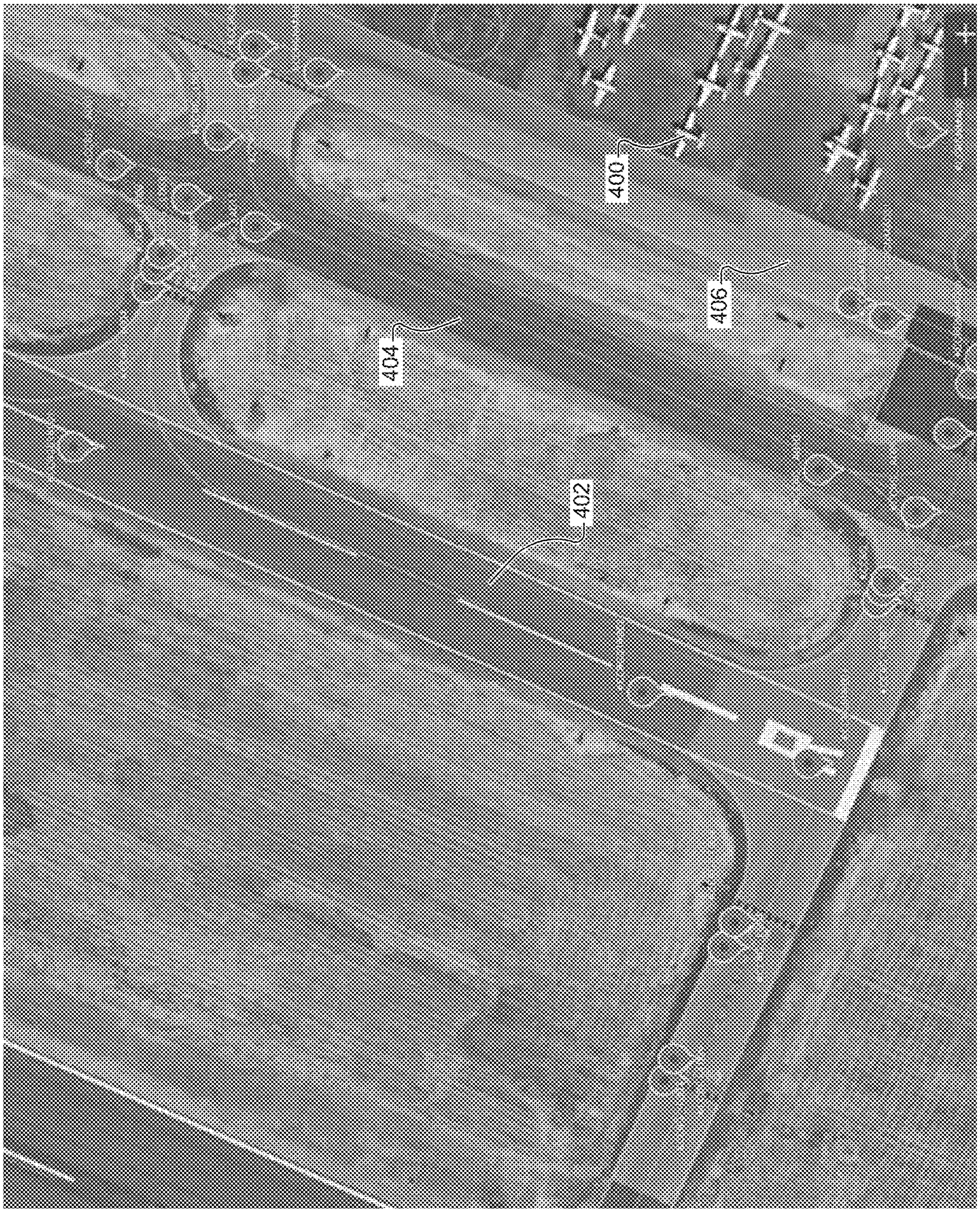
FIG. 4 illustrates example points marked for an airport visualized using a mapping application.
Figure 5:
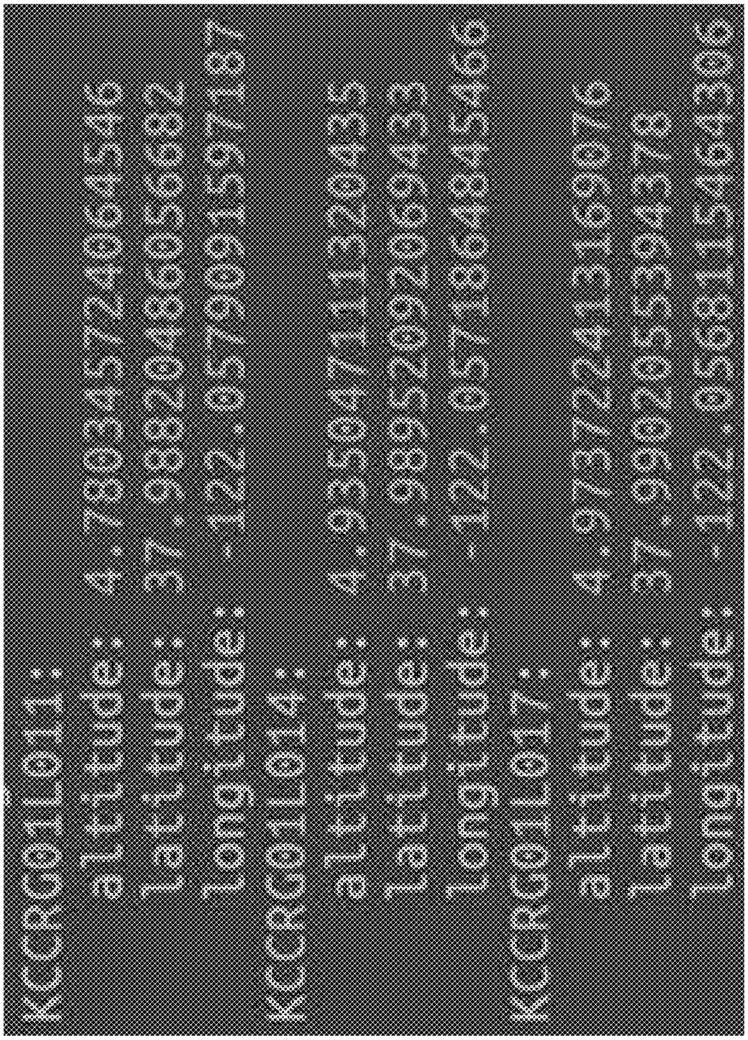
FIG. 5 illustrates the latitude, longitude, and altitude for three example points at an airport.

FIG. 4 illustrates example points marked for the Buchanan Field Airport (code/indicator CCR) in Concord, CA. The example points, marked as KCCRG points, are visualized using a mapping application (e.g., Google Earth). FIG. 5 illustrates the latitude, longitude, and altitude for three example points at the CCR airport. The altitude format in FIG. 5 is World Geodetic System (WGS84) height above ellipsoid (HAE). In FIGS. 4-5, the point label KCCR is the airport ID format, with a K prefix that may indicate that the airport is located in the contiguous United States. The G may be an internal naming convention indicating a ground point. The 01L portion indicates where the waypoint belongs (e.g., the waypoint is located on the 01L runway). The 011, 014, and 017 portions may be a sequential number for the points in the airport map. In the image of FIG. 4, there are multiple aircraft 400 (e.g., near a hangar off the image). Three types of surfaces are included in the image: 1) 1R is the runway 402, 2) next to the runway 402 is a taxiway 404 (e.g., where the aircraft 108 is compliant to ATC instructions), and 3) next to the taxiway 404 is an apron/ramp 406 (e.g., a nonmovement area where ATC 110 may not have enforced rules).

An airport map may be structured as a directed graph that includes edge data structures ("edges"). Edges may connect two points on the map and may specify stop points that belong to the edge. Edges may include a plurality of fields. Example edge data fields may include, but are not limited to, an active/inactive Boolean, points (e.g., a list of 2 points in the graph), membership data, and stop points. Example active/inactive Boolean data may indicate whether the edge is allowed to be used in the path. The active/inactive Boolean data may be used to exclude some paths (e.g., roads) from the graph, such as when the paths are closed for maintenance. The points in the edge data may include a list of 2 points in the graph. In some implementations, an airport map may include a list of all possible edges between points. In some cases, there may be edges for different directions between the same set of 2 points. In other cases, there may be edges that are only 1 way between points (e.g., 1 way roads).

The edge membership data may specify the location of the edge. In some implementations, membership data may be calculated automatically from point names (e.g., using a naming convention), but may be overridden manually. The membership data may include a location description that ties the map data to real world path names (e.g., instructed by the ATC 110). Example membership data may include a taxiway name/letter (e.g., L, A, F), a runway name (e.g., 32R, 01L), or a specified "non movement area" (NMA). For example, if there is a taxiway A, then the edge for taxiway A may have membership A. As another example, if there is a runway 14R, then membership for the edge may be 14R. In some cases, multiple edges may have the same membership. In some cases, NMA membership may be subject to optimal path planning, as the area may not be subject to ATC instructions.

Stop point data for an edge may specify what stop points may be inserted into the taxiing plan when the aircraft 108 follows the edge. An edge may include one or more stop points. Stop points may include a variety of data fields. Example stop point data fields may include, but are not limited to, stop point ID, stop point type, and heading. The stop point ID may indicate a location of the stop point. The stop point type may indicate the type of stop point, such as a hold short, optional stop, stop, or other type.

The taxiing plan may include stop points (e.g., required stop points) and optional stop points. In some implementations, the operator may view the taxiing plan, stop points, and optional stop points in a GUI (e.g., on a display at the GCS 106). Note that the stop points and optional stop points may provide preset locations for required/optional stops while taxiing. Although some stop points and optional stop points may be at preset locations, at any point during taxiing, the operator may input a stop command (e.g., in a GUI) that can stop the aircraft at any immediate/future location.

Stop points may refer to points at which operator input may be required for the aircraft 108 to continue along with the taxiing plan. For example, the aircraft 108 may be configured to stop at a stop point and wait for an operator to provide approval to continue. Example operator approval may include manual approval using an input device at the GCS 106, such as a GUI button or manual button, for approving the aircraft 108 to continue taxiing beyond the stop point. Operator approval (e.g., a continue command) may be sent to the aircraft 108 (e.g., while the aircraft 108 is stopped). Upon receiving approval from the operator, the aircraft 108 may continue according to the taxiing plan.

Stop points may be inserted into any location at which the aircraft 108 should stop and receive authorization from an operator and/or ATC 110 for continuing the taxiing plan. For example, stop points may correspond to locations at airports that require approval from ATC to continue taxiing. Example stop point locations may include locations where the aircraft is leaving a non-movement area and is entering a taxiway. Other example stop point locations may include hold short lines (e.g., before entering the runway, before crossing an active runway, and/or after coming off the runway). Other additional stop point locations not explicitly listed herein may also be inserted during generation of the taxiing plan.

An optional stop point may refer to a point at which the operator may be prompted (e.g., in a GUI) to optionally stop the aircraft. At an optional stop point, the aircraft 108 may be configured to continue along the taxiing plan unless the operator commands a stop. The optional stops may be placed in a variety of locations. For example, in some implementations, optional stops may be placed at high traffic locations in the airport, such as intersections that have experienced congestion. In cases where there is congestion at the airport (e.g., near the optional stop), an operator may choose to stop the aircraft. The optional stop points may provide an operator with easily selectable preset points at which they can conveniently stop the aircraft.

The operator may be provided with GUI elements that prompt the operator with the option to stop at the optional stop points. For example, while the aircraft 108 is taxiing, a GUI may indicate to the operator that an optional stop is coming up ahead. In a specific example, a notification may be displayed on the GUI indicating that the operator has the option of stopping the aircraft at an upcoming optional stop point. The operator may command the optional stop in the interface (e.g., using a GUI/manual button), which may cause the aircraft to stop at the optional stop point. The operator may then command the aircraft to continue taxiing after stopping. If the operator does not command the optional stop, the aircraft may continue taxiing past the optional stop point. The operator may be prompted with one or more of the optional stops while taxiing.

Figure 6A:
FIG. 6A illustrates a hold short point (KCCRG_C009).
Figure 6B:
FIG. 6B illustrates an example intersection and an example optional stop before the intersection.
Figure 6C:
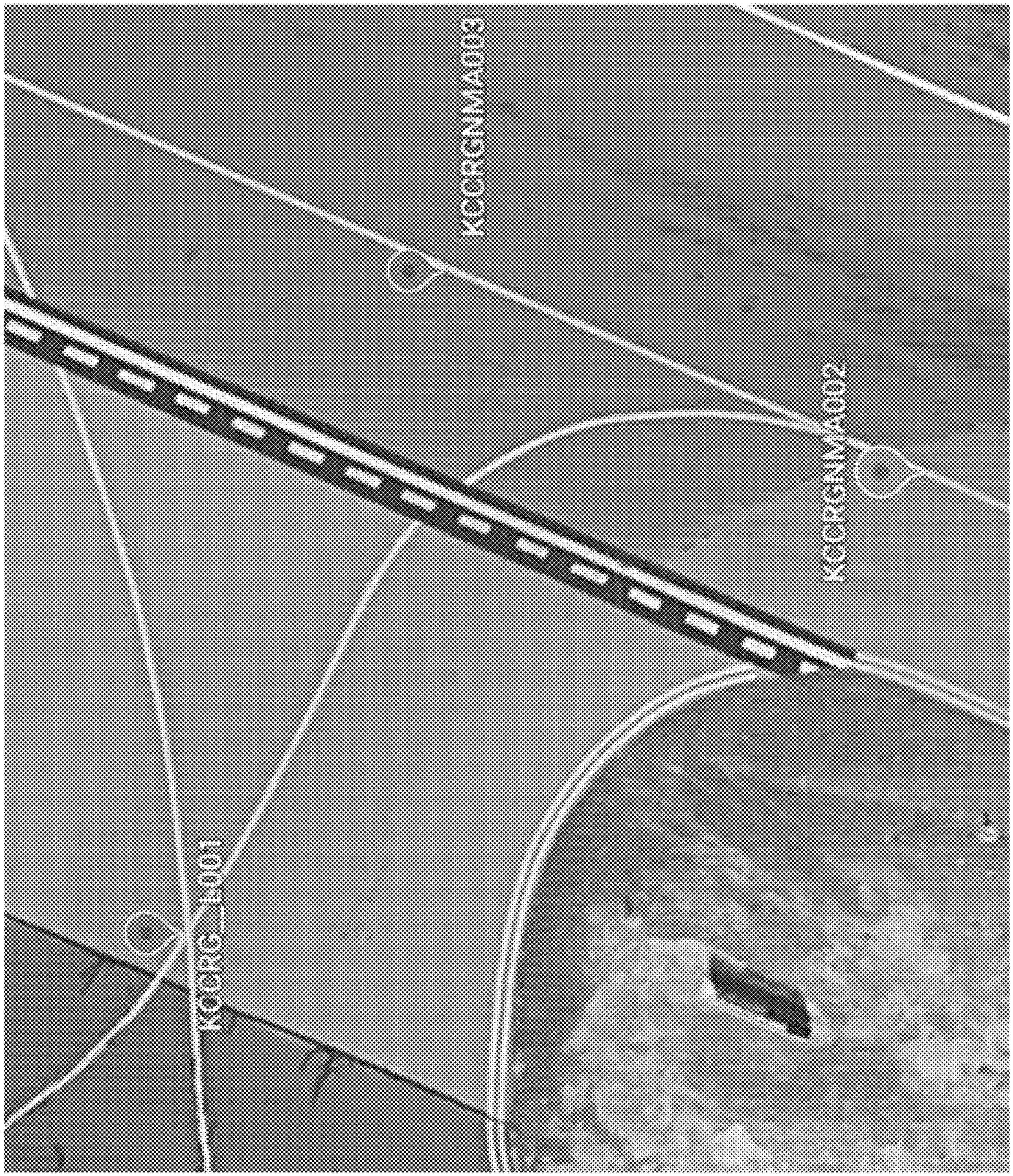
FIG. 6C illustrates an example stop before a turn.

FIG. 6A illustrates a hold short point (e.g., KCCRG_C009 is a hold short point). In this example, the aircraft 108 may stop before crossing the hold short line. FIG. 6B illustrates an example intersection and an example optional stop before the intersection (e.g., KCCRG_C002 is an optional stop). FIG. 6C illustrates an example stop before a turn. In the example of FIG. 6C, the aircraft 108 may be required to stop before making a turn. An example stop point is illustrated in FIG. 6C as KCCRGNMA002. The example stop point may be applied when the aircraft 108 plans to make a left turn to taxiway L. The example stop point may not be applied when the aircraft is driving straight. Stop point heading data may specify the direction of the aircraft 108 when the point is applied.

FIG. 7 illustrates an example edge in the CCR airport map file. The Boolean True may mean the edge is active. Points B021 and B020 may be the terminal points of the edge. Points B008 and B009 may be stop points along the edge between points B021 and B020. With respect to the heading attribute, a stop point may be inserted into the plan when the aircraft heading while following the edge matches the "heading" attribute in the stop point description.

The path planning system 112 may build a path from one point ID to another point ID. In some cases, it may not be convenient for operators to remember/identify point IDs, so aliases may provide human readable names for points (e.g., for operator convenience). In some examples, aliases may be introduced to keep information about runways, hangars, etc. Aliases may include a plurality of fields. Example alias fields may include, but are not limited to: 1) Start_taxipoint_id (e.g., a taxipoint_id when alias is used as start argument), 2) Start_heading (e.g., a heading when alias is used as start argument), 3) Destination_taxipoint_id (e.g., a taxipoint_id when alias is used as destination argument), and 4) Destination_heading (e.g., heading when alias is used as destination argument). FIG. 8 illustrates an example alias for runway 01R in the CCR airport map.

The path planning system 112 (e.g., path planning modules 1506, 1508, 1510, 1512, and 1514) may implement a path planning algorithm (e.g., a path planner) that receives path planning inputs and generates a taxiing plan output. An example path planning algorithm may include a python program that receives an input file (e.g., the airport map file) and other strings/numbers described herein. The path planning algorithm may output the taxiing plan as an output file described herein. The taxiing plan output may include a sequence of waypoints, which may each include waypoint data, such as latitude, longitude, altitude, heading, and/or action. The waypoints may define a location for a specific part of the aircraft, such as the aircraft's nose, or other part. The sequence of waypoints may indicate the edges the aircraft 108 should traverse. The action field may include various actions, or other data, such as indications to stop, not stop (e.g., continue driving), and optional stop. In some examples, waypoint data may indicate other parameters, such as ground speed setpoints, flap position setpoints, turn curvature (e.g., to aid in steering), or other data.

In some implementations, stop points may indicate that the aircraft 108 must make a full stop and that the operator must get a clearance from ATC 110 to continue taxiing after this point. In some implementations, the stop points may be used for hold short lines, non-movement area boundaries, and/or route destinations. In some implementations, non-stop points may represent the geometry of the airport and may be used for turns, cruising, etc. In some implementations, optional stop points may help the operator stop the airplane 108 and may be used for high traffic areas.

Figure 9A:
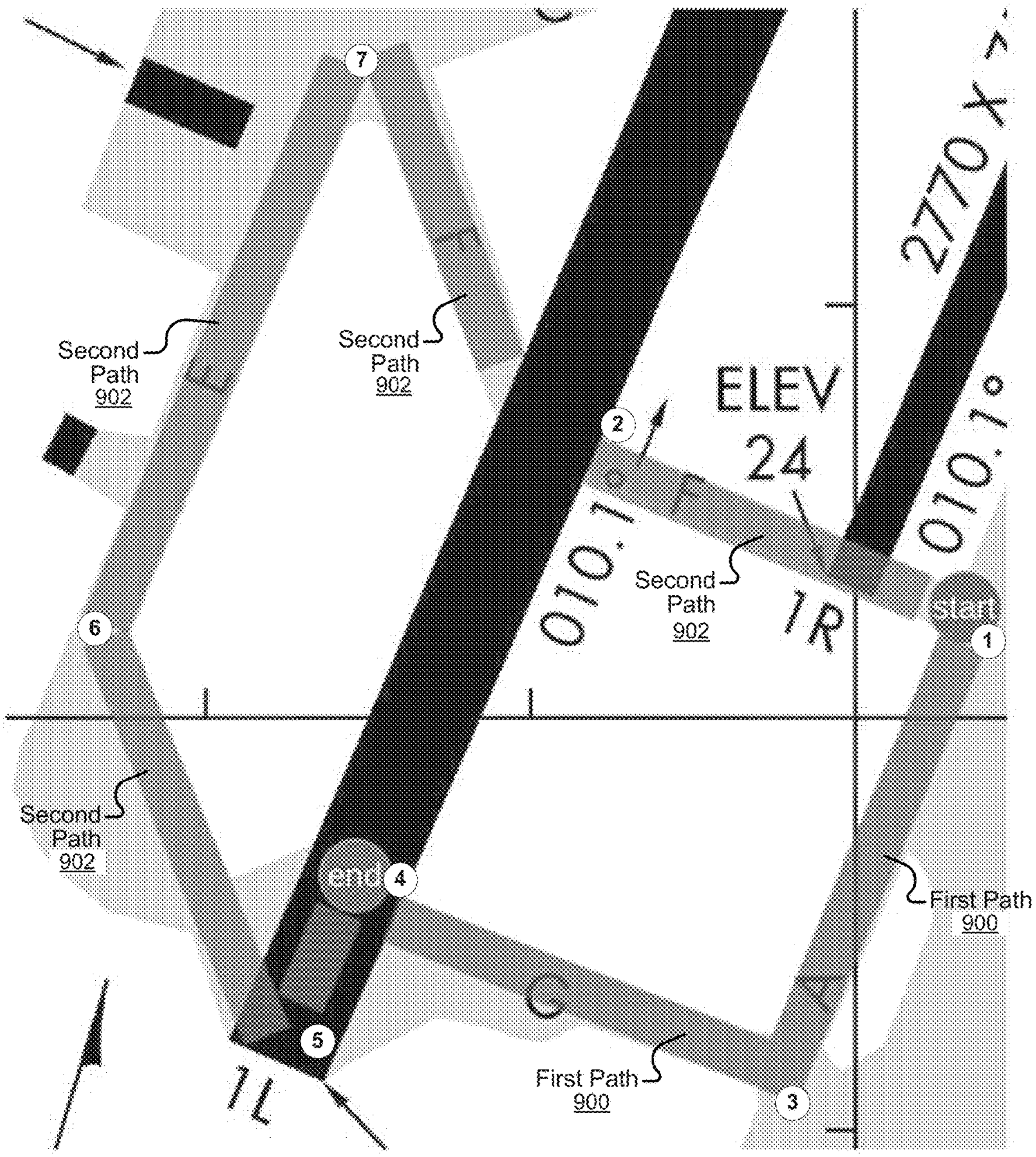
FIGS. 9A-9B illustrate example paths that may be generated by a path planning system.
Figure 9B:
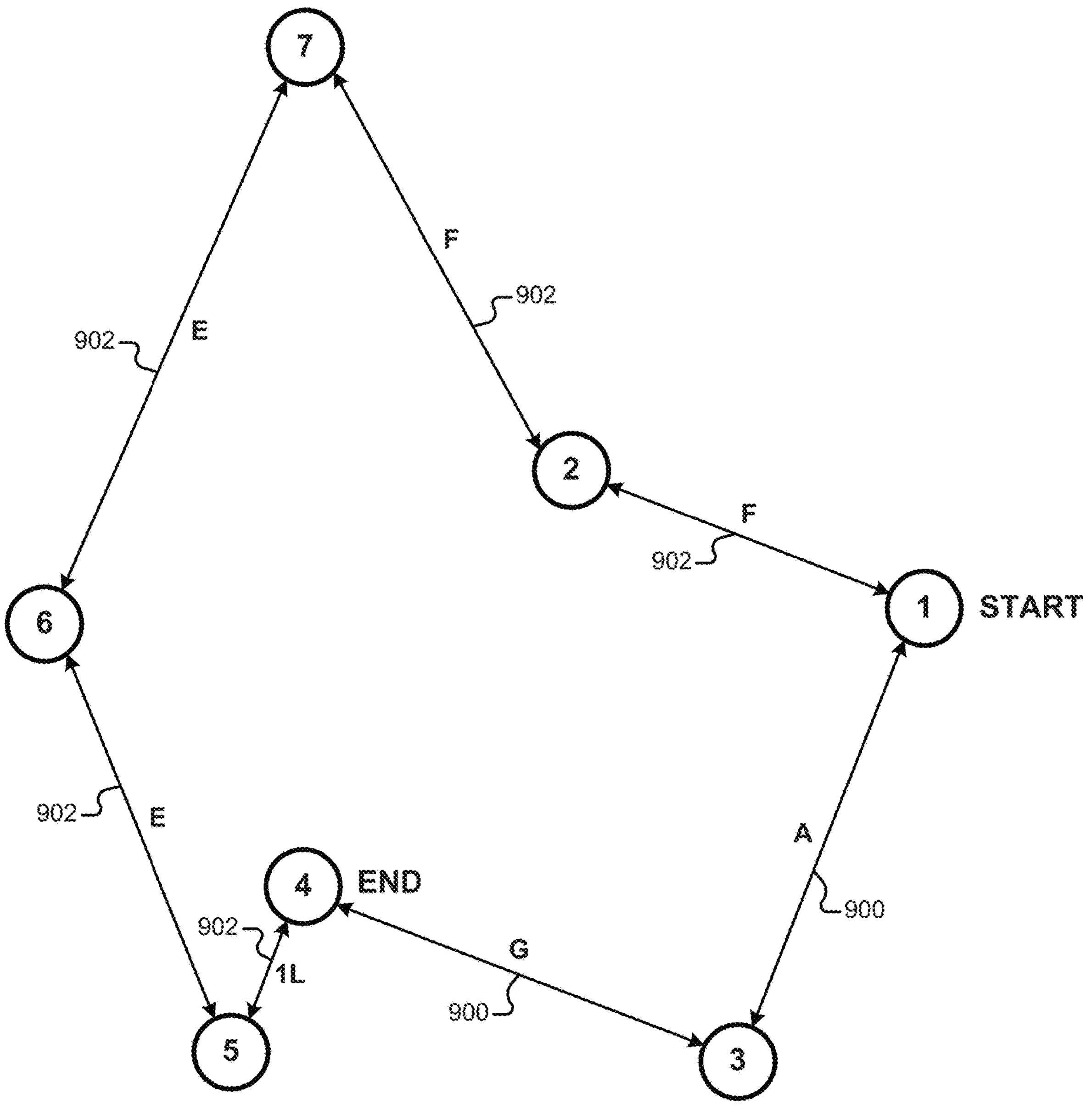

FIGS. 9A-9B illustrate example paths that may be generated by the path planning system 112. FIG. 9B is a graph that represents the image of FIG. 9A. FIGS. 9A-9B include multiple possible paths to reach the END point (point 4) from the START point (point 1). The first path 900 is via taxiways A and G. For example, the first path 900 is 1→3→4 via taxiways A and G. The second path 902 is via taxiways F and E and 1L. For example, the second possible path is 1→2→7→6→5 via taxiways F, E, and 1L. In these examples, the operator may receive explicit intermediate instructions from the ATC 110 and submit intermediate instructions to the path planning system 112. According to submitted intermediate instructions, the path planning system 112 may build the correct path. For the first path 900, the operator submits A and G as intermediate instructions, and the path planning system 112 builds the first path 900. For the second path 902, the operator submits F and E and 1L as intermediate instructions, and the path planning system 112 builds the second path 902.

Figure 10:
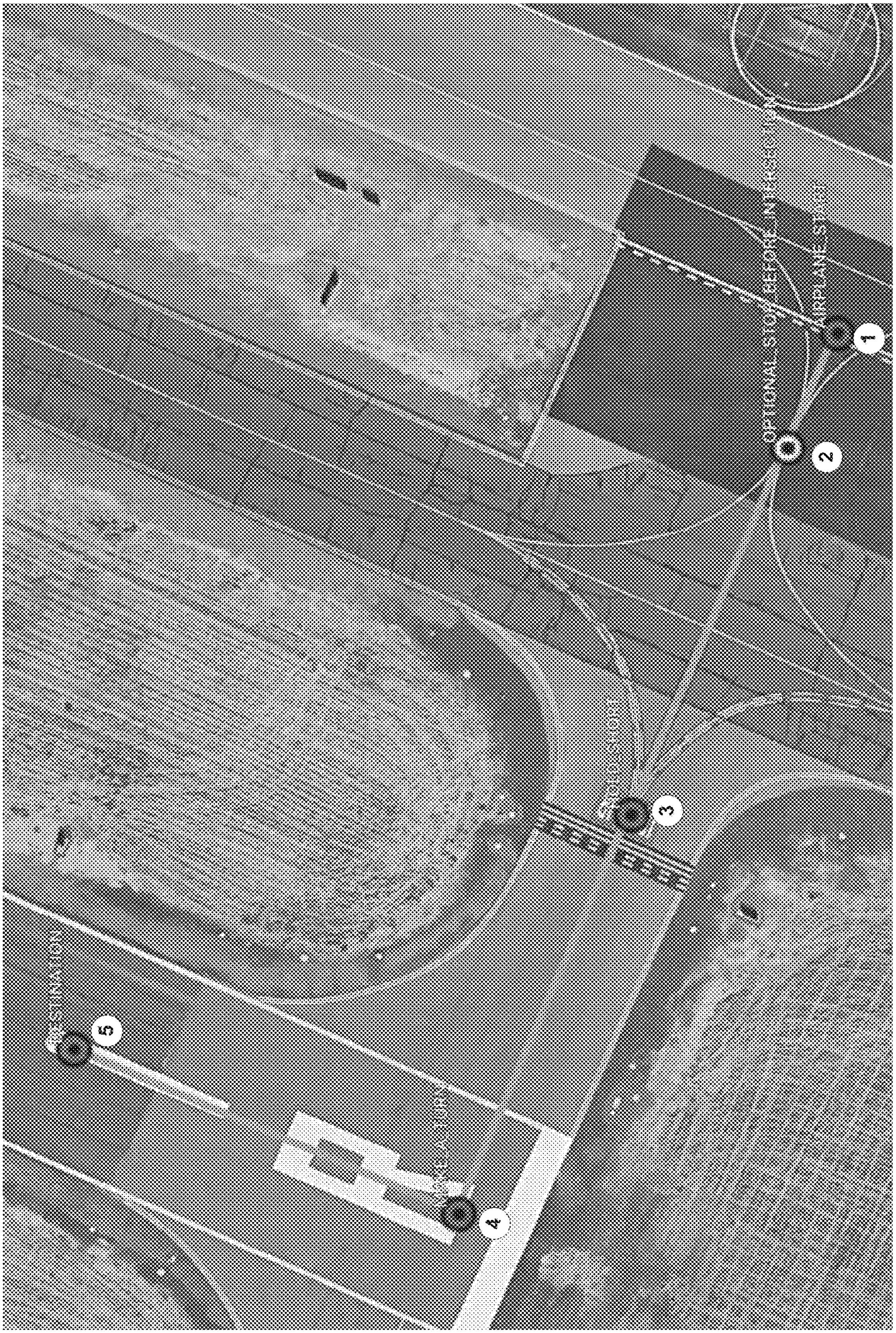
FIG. 10 includes a set of points that form an example taxiing path.

FIG. 10 includes a set of points that form an example taxiing path. At point 1, the aircraft starts in the bottom right corner (e.g., at AIRPLANE_START). Point 2 is an optional stop before an intersection where the aircraft may have an opportunity to stop (e.g., in case of traffic on the intersecting taxiway). At point 3 is a hold short point where the aircraft will stop and wait for ATC clearance. At point 4, the aircraft will make a turn at the "MAKE_A_TURN" point. At point 5, the aircraft will reach the destination point and stop.

The path planning system 112 and the taxiing control system 114 may provide user interfaces that allow the operators to generate, review, modify, and monitor the airport maps and taxiing plans. Example user interfaces may include GUIs including graphical elements, such as graphical representations for the maps, paths, and calculations described herein. Example GUIs may include GUIs that show map points and paths, such as the images in FIGS. 4, 6A, 6B, 6C, 9A-9B, and 10.

In some implementations, the user interfaces may include input GUI elements that operators may use to input data into the systems, such as GUI buttons or other data entry elements (e.g., text boxes, drop down lists, etc.). In some implementations, the user interfaces may include other input elements/devices, such as microphones for voice-to-text processing and/or other mechanical interface elements (e.g., buttons, switches, etc.).

Figure 11:
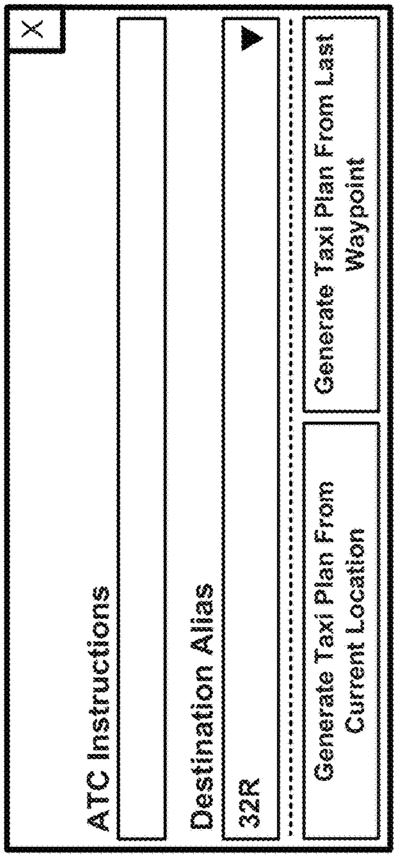
FIG. 11 illustrates an example graphical user interface (GUI) that may be provided by a path planning system.

FIG. 11 illustrates an example GUI that may be provided by the path planning system 112. The "ATC instructions" field accepts a list of instructions provided by the ATC 110. The "Destination Alias" may include a drop-down list of aliases for the airport 100. The "Generate Taxi Plan From Current Location" button may cause the path planning system 112 to take the current aircraft location as the start point and build a new plan according to user requirements. The "Generate Taxi Plan From Last Waypoint" button may cause the path planning system 112 to use the last point in the queue as the start point and append a new plan (based on user requirements) to the end of the queue. This may work in the scenario where the aircraft 108 has some waypoints in the queue.

Figure 12:
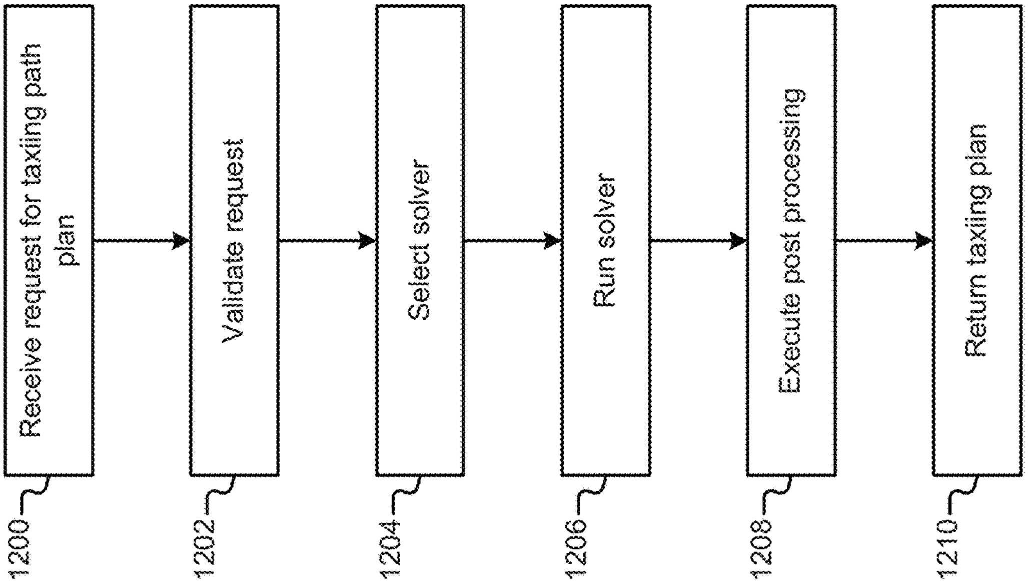
FIG. 12 illustrates a method that describes example operations of a path planning system.

FIG. 12 illustrates a method that describes example operations of the path planning system 112. In block 1200, the path planning system 112 (e.g., a data acquisition and validation module 1508) receives a request for a taxiing plan. The request may be generated manually by an operator and/or triggered in another manner, such as 1) in response to approaching an airport for a landing, 2) in response to ATC instructions, 3) based on distance from an airport (e.g., in response to being a threshold distance from the airport), 4) time of arrival/departure (e.g., in response to being within a threshold time from arrival/departure), and/or other automatic triggers.

In block 1202, the path planning system 112 (e.g., data acquisition and validation module 1508) validates the request. Validating the request may include determining that all required information has been provided to the path planning system 112 for calculation of the taxiing plan. Request validation may include validation and processing of various inputs. Example inputs may include a start location, such as a start alias (e.g., holding information about map point id and heading), a map point id/heading, and/or a latitude/longitude/heading. Another example input may include a destination location, such as a destination alias (e.g., holding information about map point id and heading) and/or a map point id/heading.

In block 1204, the path planning system 112 (e.g., solver module 1510) selects a solver. In implementations where the path planner receives ATC instructions (e.g., a list of ATC instructions), the ATC instructions may define a single path corresponding to the instructions. In implementations or locations without ATC instructions (e.g., non-towered airports and/or NMAs), the path planner may generate a valid path using one or more path planning techniques, such as a shortest valid path technique that may conserve fuel. In some implementations, path planning may include optimizing for other path characteristics, such as travel time, distance, simplicity (e.g., fewest turns), number of segments, or other characteristics. Two example solvers may include: 1) an exact solver and 2) a proximate solver. An exact solver may be used if the start point and the destination point are known. The proximate solver may estimate the position of the aircraft on the edge.

In block 1206, the path planning system 112 (e.g., solver module 1510) runs the selected solver. Running the solver may include finding a path (e.g., a list of edges) to be output by the solver. As described herein, in some implementations, the solver may be configured to find a shortest path (e.g., via a Dijkstra-type algorithm). The solver may implement one or more termination conditions, which may include finding all solutions, finding a single solution, or finding solutions that meet termination criteria (e.g., a length of path).

In block 1208, the path planning system 112 (e.g., post-processing module 1512) may perform post processing operations. Post processing may refer to an additional set of constraints that may be applied to the list of edges. In some implementations, post processing may include a list of steps that modifies edges produced by the path planning algorithm. A pipes and filters approach may be used to implement this functionality. In some implementations, stop points may be inserted during post processing. An "insert stop point" filter may look for stop points that belong to the given edge and insert stop points to the edge list, breaking the original edge to smaller edges. In some implementations, post processing may transform the list of edges to the list of waypoints. In block 1210, the path planning system 112 returns the taxiing plan for execution by the aircraft 108.

In some implementations, the path planning system 112 (e.g., a pre-processing module 1506) may implement preprocessing to prepare input to the path planning algorithm. Preprocessing may include transforming ATC instructions to membership transitions. Membership transitions may look similar to ATC instructions, but there may be a semantic difference. ATC instructions may refer to user provided entries. Membership transitions may indicate the sequence of edge membership during graph traversal. For example, membership transitions of ["J", "B", "32R"] may mean that the aircraft 108 would be allowed to visit edges only with membership "J". After that, the aircraft 108 would be allowed to visit edges only with membership "B". Then, the aircraft 108 may be allowed to visit edges with membership "32R." Preprocessing may also include building a membership transition filters sequence. The list of filters may be built during the preprocessing step and used at a path planning step. There may be different filters present, depending on user provided input.

As described herein, in some implementations, the path planning algorithm input may receive one or more of the following inputs: 1) a first edge in the graph, 2) a last edge in the graph, 3) a list of membership transitions (e.g., internal representation of ATC instructions), 4) a list of functions (filters) that prohibit certain edge transitions based on geometry (e.g., prohibit sharp turns or prohibit going backwards in the graph at a 180 degree turn), and 5) a list of functions (filters) that prohibit certain edge transitions based on membership, which may be used to allow transitions based on edge membership or ignore them (e.g., when a towered airport operates as un-towered). The path planning algorithm may output a Boolean that indicates whether a path exists along with a list of edges.

In general, the path planning algorithm may operate in a similar manner for taxiing before takeoff or taxiing after landing. However, in some implementations, the path planning algorithms may take into account some additional considerations depending on whether the aircraft is landing or taking off, such as flap position and other aircraft control parameters. Although the path planning system 112 may generate entire taxiing plans for the aircraft to follow, in some implementations, the aircraft (e.g., sensors, navigation system, etc.) and/or GCS 106 may be configured to automatically detect features of the airport 100 and generate/modify the taxiing plans and/or aircraft controls based on the automatically detected features. Example features that the aircraft 108 and/or GCS 106 may automatically detect and use during taxiing may include, but are not limited to, centerlines of runways and taxiways, runway and taxiway markings, navigation signs, and holding points.

Figure 13A:
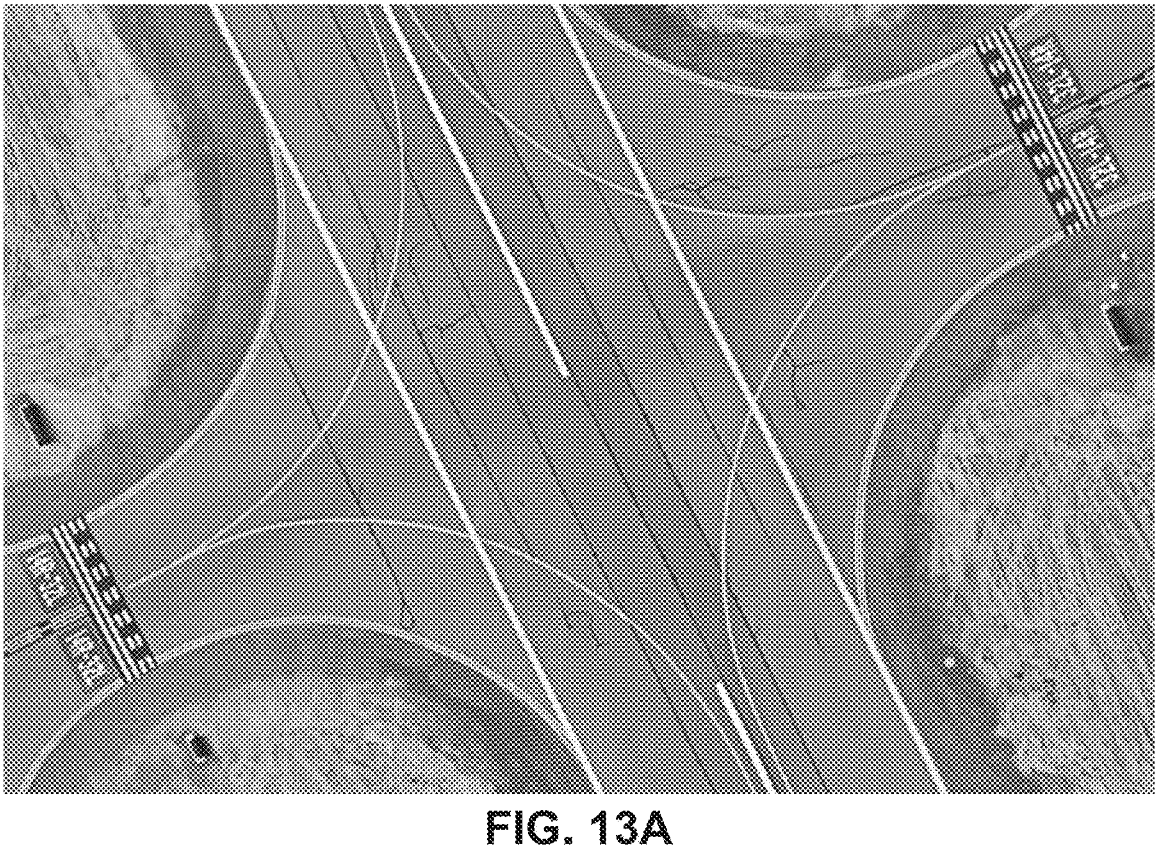
FIGS. 13A-13D illustrate how a path planning system may enhance some maps to include additional features.
Figure 13B:
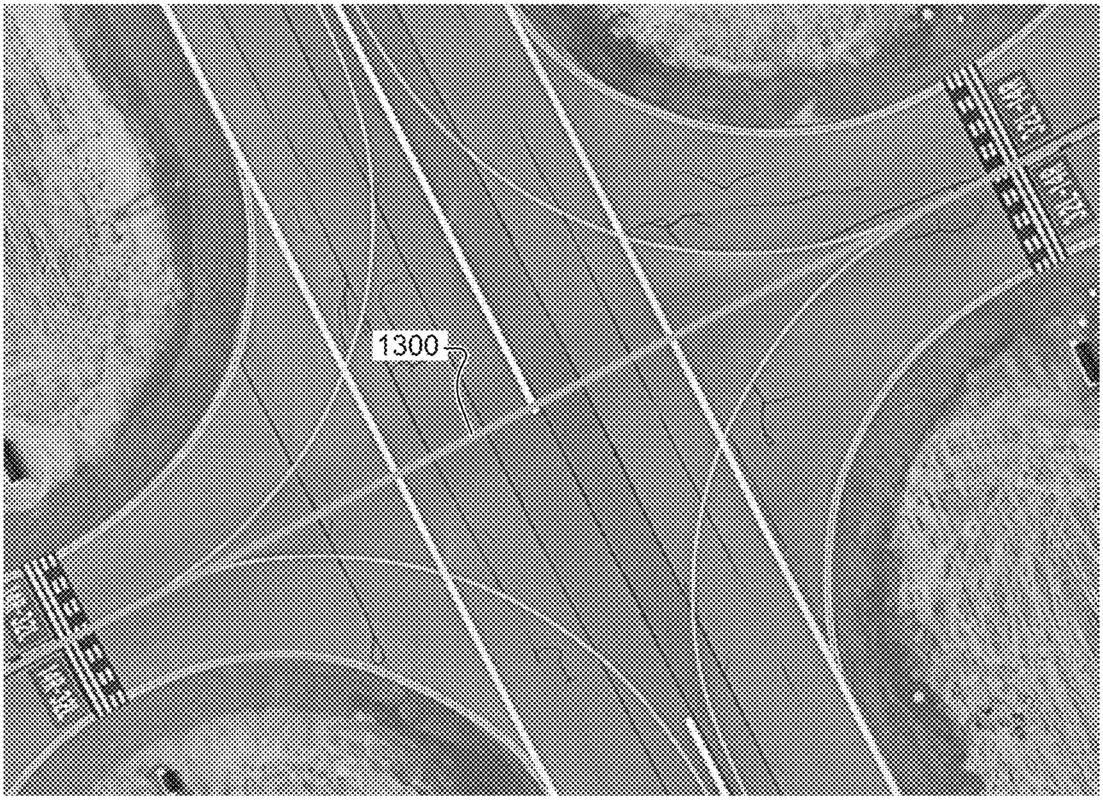
Figure 13D:
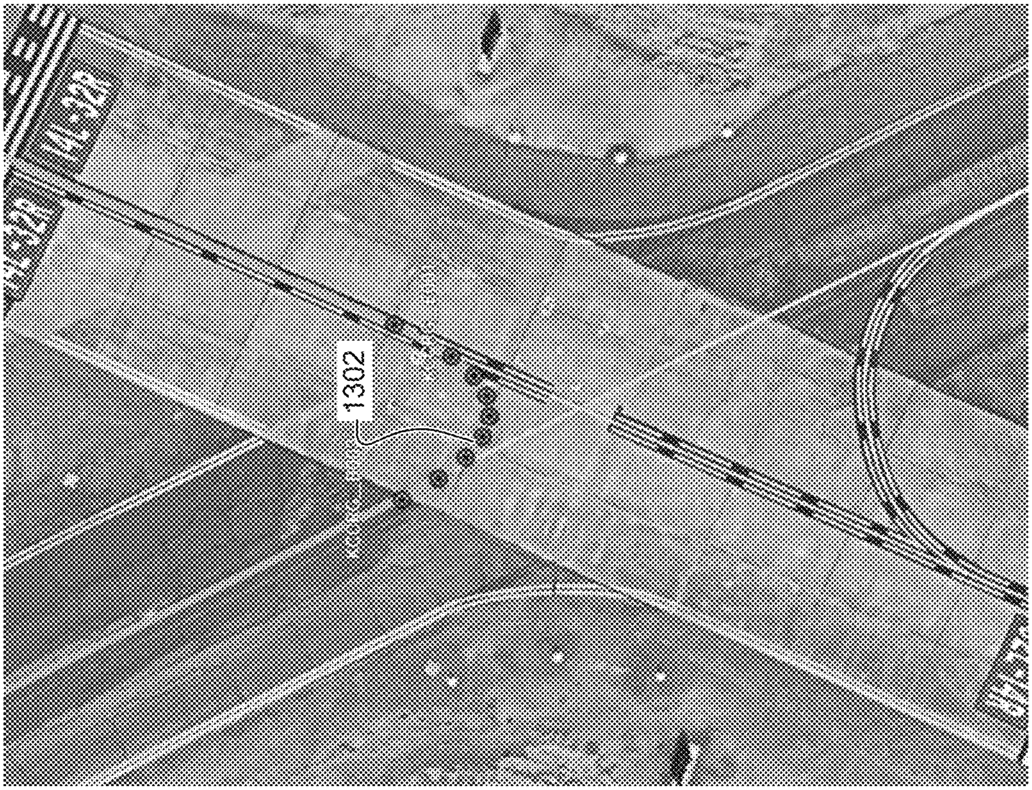
Figure 13C:
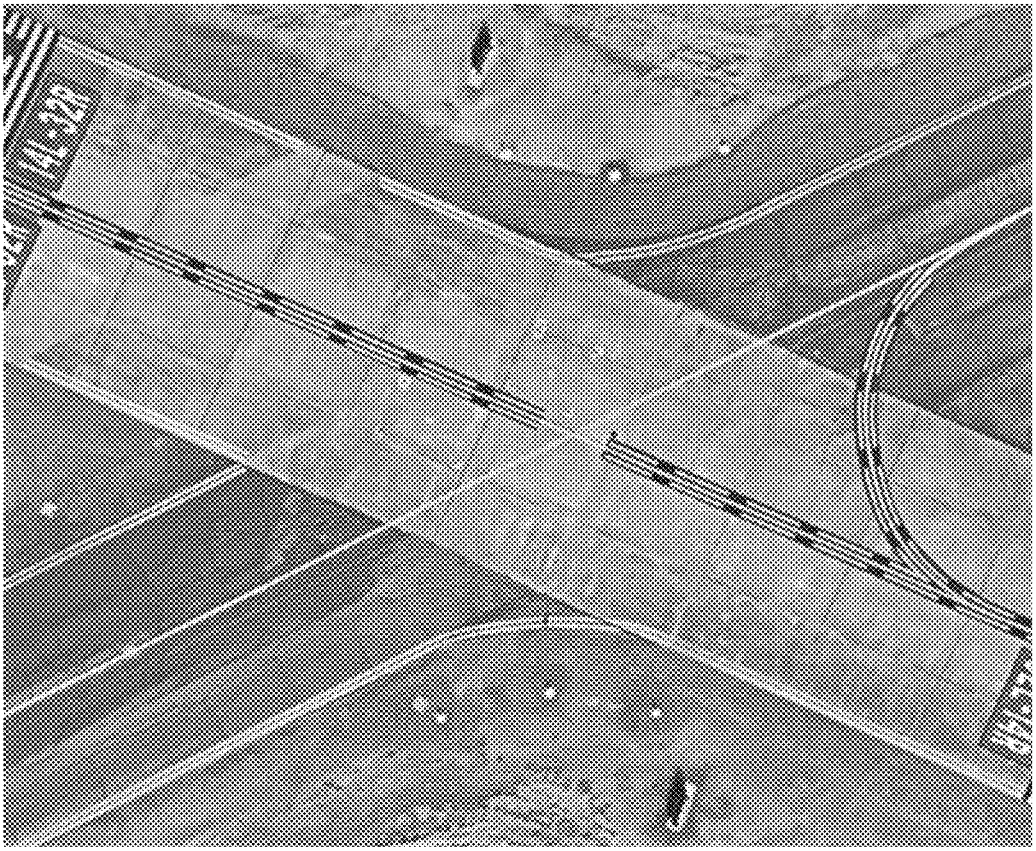

FIGS. 13A-13D illustrate how the path planning system 112 may enhance some maps to include additional features, such as features that are not included in some airport map formats (e.g., Airport Mapping Database (AMDB) maps) and/or the physical airport itself (e.g., turn markings). In one example, some map formats may include information regarding the position of hold-short lines. However, the aircraft should stop prior to a hold-short line. In this case, the path planning system 112 may use the position of hold-short lines to find the position of the aircraft nose where the aircraft is expected to stop before crossing the hold-short line (e.g., using a depth first search algorithm). In another example, the path planning system 112 may generate centerlines for the aircraft to follow. For example, FIG. 13B illustrates a centerline 1300 generated by the path planning system 112 that was absent from the map illustrated in FIG. 13A. In some implementations, the path planning system 112 may use cubic spline interpolation to fix the missing markings/geometry. FIGS. 13C-13D illustrate an example in which the path planning system 112 generated a turning line 1302 in FIG. 13D that was not present in the map of FIG. 13C.

The GCS 106 sends the taxiing plan to the aircraft 108 for automated taxiing. In some implementations, the generated taxiing plan may be executed by a taxiing control system 1400 (e.g., by a taxi autopilot 1402) that may include taxiing control system modules. The taxiing control system 1400 (e.g., TCS 1400 of FIGS. 14A-14B) may include taxi steering control. The taxi steering control may actuate the nose wheel steering, rudder, and/or differential brakes to cause the aircraft 108 to track the waypoints/lines. In some implementations, the steering control may track line segments interpolated between waypoints. In some implementations, the steering control may track smooth curves generated between waypoints. In some implementations, the steering control may track a spline generated to fit the waypoints. Example steering control algorithms may include, but are not limited to, PID control based on cross track and heading error, nonlinear controllers based on wheel steering kinematics, L1 path following guidance, and model predictive control. The steering control may use path curvature information embedded in the mission waypoints to enhance the tracking performance. In some cases, the path curvature may be inferred from the angle between consecutive waypoint segments. In some implementations, the lateral tracking/steering controller may also take the current aircraft groundspeed into account, and this may be used to schedule controllers, such as an L1 controller, as well as schedule the acceptance radius of high density waypoints to improve the tracking of curves during turns.

The taxiing control system 1400 may include taxi speed control. Taxi speed control may actuate the power lever and the brakes to cause the aircraft 108 to track the speed setpoints and stop at the stop waypoints. The taxi speed control may enforce acceleration and jerk limits for safety and ride comfort. Taxi speed control may be implemented in a variety of ways. In some implementations, the taxi speed control may have an outer loop that computes an acceleration setpoint based on the speed error and distance to the stop waypoint. In some implementations, the taxi speed control may have an inner loop that uses the power lever and brake to track the acceleration setpoint. The taxi speed control may have logic to determine when to use throttle vs brake. In some cases, the taxi speed control may use model predictive control to compute the power lever and brake commands directly from speed setpoints, aircraft speed, and distance to the stop waypoint without computing an explicit acceleration setpoint. The speed control may use path curvature information embedded in the mission waypoints to reduce speed as a function of turn curvature.

In some implementations, the generated plan may be executed manually. For example, an operator on the aircraft 108 or in a remote GCS 106 may control the steering, power lever, and brakes to cause the aircraft 108 to follow the generated waypoints, track the speed setpoints, and stop at the stop waypoints. In some implementations, the taxiing control system 1400 may implement detection and avoidance during taxiing. For example, the taxiing control system 1400 may detect and avoid other aircraft while taxiing based on sensor data (e.g., images, radar, light detection and ranging systems (LIDAR), etc.) and/or other data.

Figure 14A:
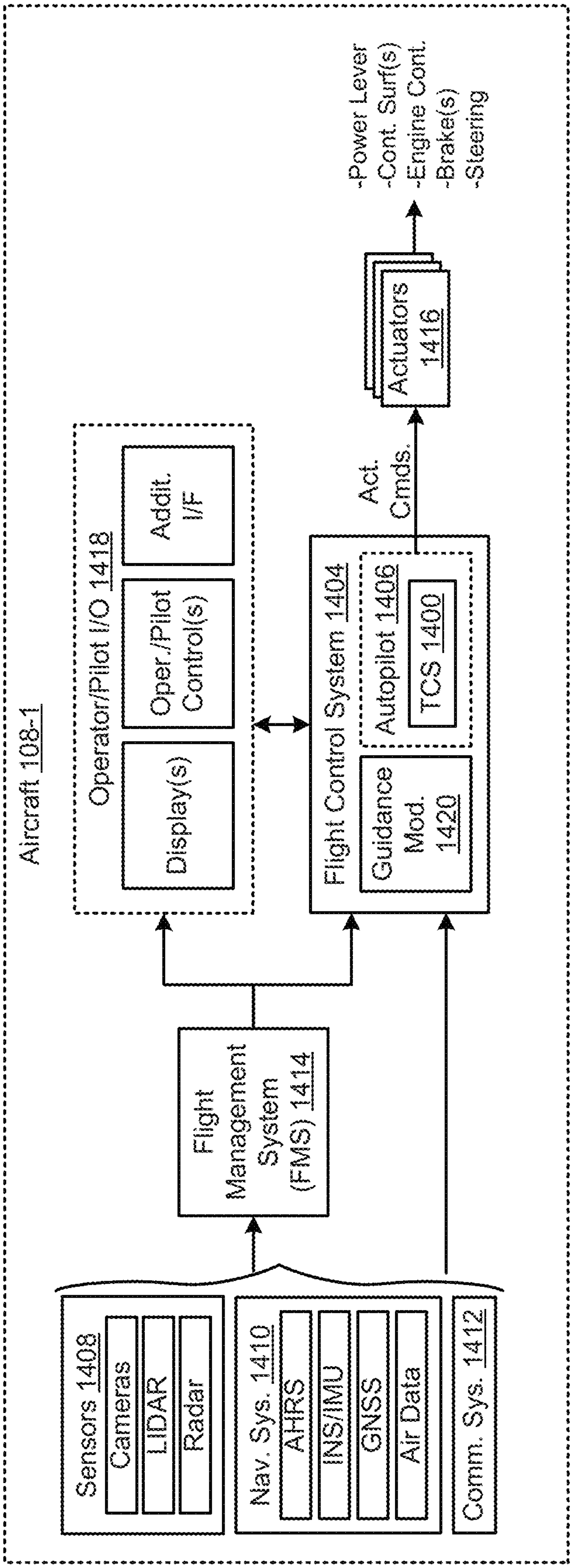
FIGS. 14A-14B illustrate functional block diagrams of example aircraft that execute a taxiing plan.
Figure 14B:
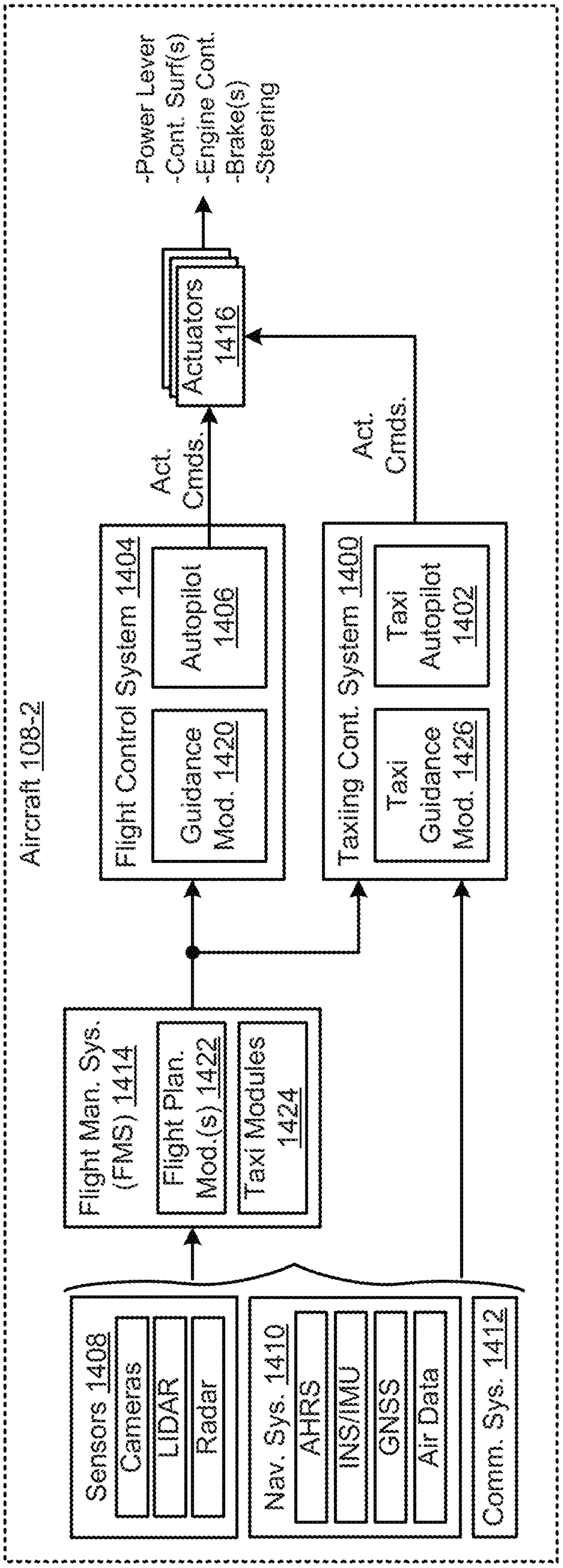

FIG. 14A illustrates a functional block diagram of an example aircraft 108-1 (e.g., an unmanned aircraft) including a flight control system 1404 (e.g., autopilot system 1406) that executes a taxiing plan. The aircraft 108-1 of FIG. 14A includes: 1) sensors 1408 (e.g., cameras, LIDAR, radar, etc.), 2) navigation systems 1410, 3) communication systems 1412, 4) a flight management system 1414 (FMS), 5) a flight control system 1404, 6) actuators 1416, and 7) operator/pilot input/output (I/O) 1418. Although the aircraft 108 may include operator/pilot I/O in some implementations, the aircraft 108 may be operated as an unmanned aircraft. In some implementations, the aircraft 108 may not include operator/pilot I/O (e.g., aircraft 108-2 of FIG. 14B), such as when the aircraft 108 is an autonomous aircraft. Although the flight control system 1404 may execute the taxiing plan, other components of the aircraft 108 may execute the taxiing plan. In some implementations, the aircraft 108 may include a separate taxiing control system 1400 (e.g., outside of the flight control system 1404 as illustrated in FIG. 14B).

The aircraft 108-1 may include a navigation system 1410 that generates navigation data. The navigation data may indicate the location, altitude, velocity, heading, and attitude of the aircraft 108-1. The navigation system 1410 may include a Global Navigation Satellite System (GNSS) receiver that determines the latitude and longitude of the aircraft 108-1. In some implementations, the navigation system 1410 may include an inertial navigation system (INS) that may include an inertial measurement unit (IMU) that provides rotational orientation data (e.g., attitude data) including pitch, roll, yaw, and attitude rate data (e.g., pitch rate, roll rate, and yaw rate). In some implementations, the navigation system 1410 may include an attitude and heading reference system (AHRS) that may provide attitude and heading data for the aircraft 108-1. The navigation system 1410 may include an air data system (e.g., a Pitot-static tube, air data computer, etc.) that may provide airspeed, angle of attack, sideslip angle, altitude, and altitude rate information. The navigation system may include a radar altimeter and/or a laser altimeter to provide Above Ground Level (AGL)

altitude information. In some implementations, the navigation system 1410 may include an instrument landing system (ILS). In some implementations, the navigation system 1410 may also include other features, such as differential GPS, Real-Time Kinematics (RTK) GPS, and/or a ground-based augmentation system for aircraft landing (GBAS).

The aircraft 108-1 may include a plurality of sensors 1408 that generate sensor data, such as sensor data that can be used to acquire images and detect other aircraft and objects while taxiing. For example, the aircraft 108-1 may include one or more radar systems, one or more electro-optical (E/O) cameras, one or more infrared (IR) cameras, and/or LIDAR. The radar systems and cameras may detect other aircraft. Additionally, the sensors (e.g., cameras and LIDAR) may determine whether the runway is clear when approaching for a landing.

The aircraft 108-1 may include one or more communication systems 1412. For example, the aircraft 108-1 may include one or more satellite communication systems, one or more ground communication systems, and one or more air-to-air communication systems. In some implementations, the communication systems 1412 may form data links. In some implementations, the communication systems 1412 may receive a taxiing plan and a flight plan data structure from the GCS 106 and/or the ATC 110. In some implementations, the communication systems 1412 may transmit data to the GCS 106 that is associated with the taxiing control system 1400, such as current edges being traversed, current control parameters (e.g., speed, heading, etc.), and other monitored parameters during taxiing.

The aircraft 108-1 may include a flight management system 1414 (FMS) that may receive and/or generate one or more flight plan data structures (i.e., flight plan data) that the aircraft 108-1 may use for navigation during flight. A flight plan data structure may include a sequence of waypoints that each indicate a target location for the aircraft 108-1 over time. A waypoint may indicate a three-dimensional location in space, such as a latitude, longitude, and altitude (e.g., in meters). Each of the waypoints in the flight plan data structure may also be associated with additional waypoint data, such as a waypoint time (e.g., a target time of arrival at the waypoint) and/or a waypoint speed (e.g., a target airspeed in knots or kilometers per hour). The flight plan data structure may be generated for different phases of flight, such as departure, climb, cruise, descent, approach, and missed approach. In some implementations, a flight plan data structure may specify a flight pattern (e.g., near an airport, landing, departing, etc.). The flight plan data structure may be generated in a variety of ways. In some implementations, the flight plan data structure may be manually constructed. In some implementations, the flight plan data structure may be automatically generated.

A remote operator, autopilot, and/or onboard operator/pilot may control the aircraft 108-1 according to the generated flight plan data structure. For example, a flight plan data structure may be used to land the aircraft, take off from a runway, navigate en route to a destination, perform a missed approach, and/or hold the aircraft in a defined space. In some implementations, the flight plan may be displayed to the remote operator on a display so that the remote operator may follow the flight plan.

The aircraft 108-1 includes a flight control system 1404 that generates actuator commands based on a taxiing plan or a flight plan data structure. The flight control system 1404 may include a guidance module 1420 and an autopilot system 1406. The flight control system 1404 illustrated and described herein is only an example flight control system. As such, other flight control systems including additional/alternative components may be implemented according to the techniques of the present disclosure.

The flight control system 1404 may generate control commands that control the aircraft 108-1. For example, the flight control system 1404 may generate commands that control the actuators 1416 and the engines (e.g., via an engine controller). The flight control system 1404 may control the aircraft 108-1 according to remote operator inputs from the GCS operator controls and/or commands generated by the FMS 1414 (e.g., autopilot commands).

The flight control system 1404 may include a guidance module 1420. In some implementations, the guidance module 1420 may receive the flight plan data structure and additional information regarding the state of the aircraft 108-1, such as a current location (e.g., a latitude/longitude/altitude), velocity, and aircraft attitude information. Based on the received information, the guidance module 1420 may generate autopilot commands for the flight control system 1404. Example autopilot commands may include, but are not limited to, a heading command, a desired airspeed command, a desired altitude command, and a roll command.

The flight control system 1404 may include an autopilot system 1406 that controls the aircraft 108-1 based on autopilot commands received from the guidance module 1420. For example, the autopilot system 1406 may output control signals/commands that control actuators 1416 (e.g., power lever actuators for one or more engines, one or more elevator actuators, brake actuators, steering actuators, etc.). In some implementations, the aircraft 108-1 may include an engine controller that controls one or more engines, such as turboprop engines or other engine types. The engine controller may control the engine(s) based on received engine commands, such as a power lever position command. For example, the engine controller may control fuel and other engine parameters to control the engines according to the received engine commands. In some implementations, the engine controller may include a full authority digital engine control (FADEC) that controls the engines. Example engines may include, but are not limited to, a piston engine, turboprop, turbofan, turbojet, jet, and turboshaft. In some implementations, the aircraft may include one or more electric motors (e.g., fixed, tilting, etc.). In some implementations, the aircraft may include a propeller system. Example aircraft may include fixed wing aircraft, rotorcraft, vertical takeoff and landing aircraft (VTOL), and hybrid configurations, such as tilt-wing aircraft, and electrical vertical takeoff and landing aircraft (eVTOL).

The autopilot 1406 may receive autopilot commands from the FMS 1414 and/or the operator controls (e.g., from the GCS 106 and/or an onboard operator/pilot). The autopilot 1406 may operate in a plurality of different modes. In one example mode, the autopilot 1406 receives data (e.g., a taxiing plan and/or a flight plan data structure) from the FMS 1414 and the autopilot 1406 controls the aircraft 108-1 according to the data received from the FMS 1414. In another mode, a remote operator may use remote operator controls (e.g., on a control panel/screen at the GCS 106) to generate control inputs for the autopilot 1406.

The aircraft 108-1 may include a plurality of control surfaces. Example control surfaces may include, but are not limited to, ailerons, tabs, flaps, rudders, elevators, stabilizers, spoilers, elevons, elerudders, ruddervators, flaperons, landing gears, and brakes for fixed-wing aircraft. Rotorcraft may include other controls/surfaces (e.g., rotor collective, cyclic, and tail rotor). The aircraft 108-1 can include actuators/linkages that control the control surfaces based on the commands generated by the remote operator controls and/or the autopilot 1406. The actuators and linkages may vary, depending on the type of aircraft.

The GCS/aircraft 106, 108 may include interfaces for the remote/onboard operator/pilot, referred to herein as operator input/output (I/O) devices 1418, 1500 and/or HMI. The operator I/O 1418, 1500 may include operator controls, one or more displays, and additional interfaces. The operator controls include devices used by the remote/onboard operator/pilot to control the aircraft 108, such as a flight yoke, power lever, manual buttons/switches, and other controls. The displays can display one or more GUIs. Additional interfaces may include audio interfaces (e.g., speakers, headphones, microphones, etc.), haptic feedback, and other I/O devices, such as readouts, gauges, and additional interfaces not associated with landing validation.

FIG. 14B illustrates an example aircraft 108-2 that includes an FMS 1414, a flight control system 1404, and a taxiing control system 1400. The flight control system 1404 may control the aircraft 108-2 during flight according to the flight plan. The taxiing control system 1400 may control the aircraft 108-2 during taxiing according to the taxiing plan. The FMS 1414, flight control system 1404, and taxiing control system 1400 may control the aircraft 108-2 based on data received from the sensors 1408 and navigation systems 1410. For example, the FMS 1414, flight control system 1404, and taxiing control system 1400 may control the aircraft 108-2 based on fused sensor and navigation data that indicates the aircraft location, heading, velocity, and other parameters.

The FMS 1414 may include flight plan modules 1422 that generate and/or modify flight plans described herein. The FMS 1414 may also include taxi modules 1424 that may generate and/or modify taxiing plans locally on the aircraft in a similar manner as the path planning system 112. In some implementations, the aircraft 108-2 may receive a taxiing plan from the GCS 106 (e.g., via the communication systems 1412) and subsequently modify the received taxiing plan.

In some implementations, the FMS 1414 (e.g., taxi modules 1424) may modify the taxiing plan during taxiing. For example, the taxi modules 1424 may modify taxiing plans based on detected aircraft and other objects in the environment. In some implementations, the taxi modules 1424 may implement detect and avoid operations in response to detecting aircraft and other objects. For example, the aircraft 108-2 may stop in response to detection of another aircraft or other object in the taxiing path. As another example, the detect and avoid operations may include waiting for the aircraft's turn to proceed while taxiing and/or before takeoff. In some implementations, the aircraft 108-2 may provide a camera feed to the GCS 106. In these implementations, the operator can view the camera feed while taxiing. The operator may provide an input to stop the aircraft 108-2 if any other aircraft or objects are in the path while taxiing.

The taxiing control system 1400 may be configured to follow waypoints and/or lines between waypoints. For example, the taxiing control system 1400 may follow straight lines and/or arcs between waypoints. While following the waypoints/lines, the taxiing control system 1400 may control aircraft velocity (e.g., engines, braking, etc.) so that the aircraft 108-2 smoothly accelerates/decelerates based on distance from a turn and/or stopping point. The number of waypoints and/or the use of lines/curves may vary, depending on the control implementation.

The taxiing control system 1400 may include a taxi guidance module 1426 and a taxi autopilot 1402. The taxi guidance module 1426 may determine a variety of parameters associated with the aircraft 108-2, such as the location, orientation (e.g., heading), and velocity of the aircraft 108-2 with respect to the taxiing plan. For example, the taxi guidance module 1426 may determine one or more error values with respect to the taxiing plan. Example error values may include, but are not limited to, a speed error and a steering error (e.g., cross track error, heading error, etc.). The taxi guidance module 1426 may determine the desired changes for the aircraft 108-2 based on the determined errors. For example, the taxi guidance module 1426 may determine desired speed values and desired steering values (e.g., desired angular rate values).

The taxi autopilot 1402 may generate actuator commands based on the desired values determined by the taxi guidance module 1426. For example, the taxi autopilot 1402 may generate power lever commands, brake commands, rudder commands, and other commands to follow the taxiing plan. With respect to longitudinal control, the taxi autopilot 1402 may control the power lever and/or brakes. Laterally, the taxi autopilot 1402 may control steering (e.g., nose wheel steering), brakes, and/or rudder.

Figure 15:
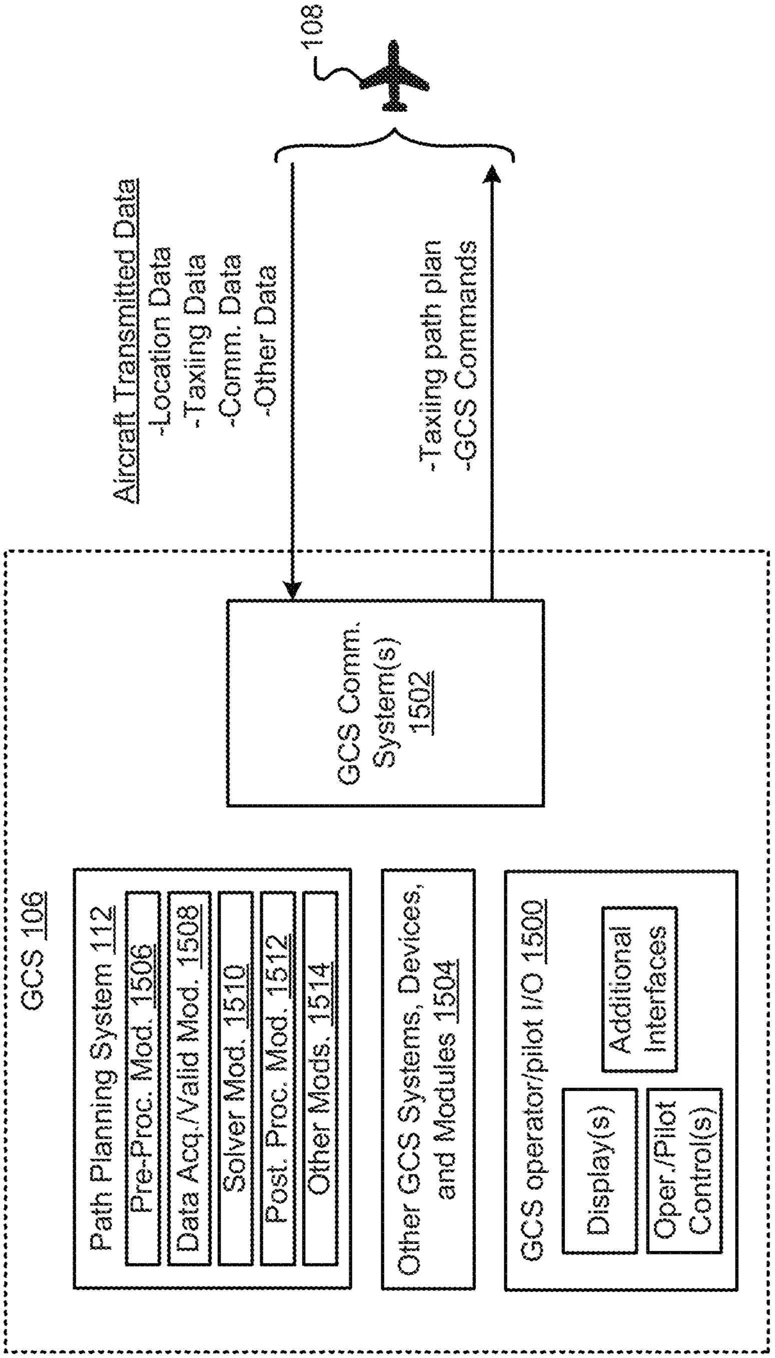
FIG. 15 illustrates an example GCS that includes a path planning system, GCS operator input/output, and a GCS communication system.

FIG. 15 illustrates an example GCS that includes a path planning system 112. The path planning system 112 may include modules that provide the path planning features described herein. For example, the path planning system 112 may include a pre-processing module 1506, a data acquisition and validation module 1508, a solver module 1510, and a post-processing module 1512. The path planning system 112 may also include other modules 1514 that may provide additional features described herein.

The GCS 106 includes GCS operator I/O 1500 described herein. The GCS 106 also includes one or more GCS communication systems 1502 that communicate with the aircraft 108. The aircraft 108 may communicate with the GCS 106 (and ATC 110) through different communications pathways (e.g., radio links, cellular, satellite, Wi-Fi, etc.). The GCS 106 may receive data acquired by the aircraft 108, such as navigation data, communication data, and data associated with the aircraft 108 while taxiing (e.g., current edge, speed, and other taxiing data).

The GCS 106 may monitor the aircraft 108 and/or control operation of the aircraft 108. The GCS 106 may send commands (e.g., operator/autopilot commands) to the aircraft 108 that control the aircraft 108. The GCS 106 includes other GCS systems, devices, and modules 1504 that provide additional functionality associated with the GCS 106. For example, the other GCS systems, devices, and modules 1504 may provide other flight management system functionality for the aircraft 108.

In some implementations, the GCS 106 may include components (e.g., operator I/O) that generate an interface for the path planning system 112. For example, the GCS 106 may include displays that display airport map and path planning GUIs described herein. As another example, the GCS 106 may include other I/O for providing an operator with path planning information and receiving path planning inputs.

Functionality associated with an example taxiing control system 1400 and path planning system 112 is illustrated and described herein. The functionality illustrated and described herein is only example functionality. Components of the aircraft 108 and the GCS 106 illustrated herein, such as the systems, modules, and data may represent features included in the aircraft 108 and the GCS 106. The systems, modules, and data described herein may be embodied by electronic hardware, software, firmware, other aircraft avionics, or any combination thereof. Depiction of different components as separate does not necessarily imply whether the components are embodied by common or separate electronic hardware or software components. In some implementations, the components depicted herein may be realized by common electronic hardware and software components. In some implementations, the components depicted herein may be realized by separate electronic hardware and software components.

The electronic hardware and software components may include, but are not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component (e.g., main memory and/or a storage device) may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology, or any other memory components.

Memory components may include (e.g., store) data described herein. Memory components may also include instructions that may be executed by one or more processing units. For example, memory may include computer-readable instructions that, when executed by one or more processing units, cause the one or more processing units to perform the various functions attributed to the systems/modules described herein. The I/O components may refer to electronic hardware and software that provides communication with a variety of different devices. For example, the I/O components may provide communication between other devices and the one or more processing units and memory components.

The systems, modules, and other components included in the aircraft 108 and GCS 106 described herein may be implemented by hardware/software components (e.g., one or more computing devices) that provide the described functionality. In some implementations, the various hardware components (e.g., electrical and/or mechanical hardware components) and software components may be retrofitted onto an existing aircraft in order to provide the aircraft functionality described herein. Additionally, or alternatively, the various hardware/software components may be integrated into the aircraft during manufacture. The functional block diagrams illustrated herein are meant to represent example functionality associated with the aircraft 108, GCS 106, and other systems described herein. As such, the aircraft 108, GCS 106, and other systems may be implemented in a variety of different ways with different hardware/software configurations. The path planning system 112 and/or the taxiing control system 1400 may be implemented on one or more of the existing aircraft computers. Similarly, features of the GCS 106 may be implemented on one or more existing GCS computers. In some implementations, the path planning and taxiing functionality described herein may be provided as software for implementation on a new/retrofitted aircraft. For example, the path planning system and taxiing functionality may be provided as a computer-readable medium including instructions that cause the computing devices in the aircraft 108 and/or the GCS 106 to provide the path planning and taxiing functionality.

As described herein, the functionality associated with the taxiing control system 1400 and the path planning system 112 may be implemented for manned or unmanned aircraft. In the case of a manned aircraft (e.g., a piloted aircraft), the path planning and automatic taxiing features may be used as an alternative form of aircraft control for the onboard operator/pilot. As another example, an onboard operator/pilot may use the path planning and automatic taxiing features as a convenience feature for taxiing. In some implementations, the onboard operator/pilot may view the path planning features and taxiing features on operator/pilot I/O 1418. For example, the onboard operator/pilot may view generation of the taxiing plan and execution of the taxiing plan on a GUI. In some implementations, a remote/onboard operator/pilot may manually control the aircraft 108 according to the path planning features and the taxiing features displayed on the operator/pilot I/O 1418, 1500.

What is claimed is:

1. A non-transitory computer-readable medium comprising computer-executable instructions, the computer-executable instructions causing one or more processing units of a computing device to:
- acquire an airport map that includes a plurality of edge data structures, each of the edge data structures including a plurality of waypoints and membership data that indicates a location at an airport;
- access a sequence of membership transitions associated with the membership data, the membership transitions configured to indicate a sequence of edges satisfying a membership rule for the plurality of edge data structures;
- access geometry information of at least one edge transition between edge data structures;
- receive a starting location and a starting heading of an aircraft at the airport;
- determine a destination location and a destination heading for the aircraft at the airport;
- generate a taxiing path plan for the aircraft based on the airport map, the starting location, the starting heading, the sequence of membership transitions, the geometry information associated with the at least one edge transition, the destination location, and the destination heading, wherein the taxiing path plan includes a sequence of waypoints from the edge data structures; and
- send the taxiing path plan to the aircraft.

2. The computer-readable medium of claim 1, wherein the membership data for an edge data structure specifies a runway name, a taxiway name, or a non-movement area.

3. The computer-readable medium of claim 1, further comprising instructions that cause the one or more processing units to determine the starting location and the starting heading based on sensor data from sensors on the aircraft.

4. The computer-readable medium of claim 1, further comprising instructions that cause the one or more processing units to generate the taxiing path plan using a shortest path algorithm.

5. The computer-readable medium of claim 1, wherein the taxiing path plan includes one or more stop points that each indicate a required location for the aircraft to stop during taxiing.

6. The computer-readable medium of claim 1, wherein the taxiing path plan includes one or more optional stop points that each indicate a preset location at which the aircraft can be optionally stopped by a human operator.

7. The computer-readable medium of claim 1, wherein a plurality of the edge data structures include Boolean values that indicate whether the edge can be used for the taxiing path plan.

8. The computer-readable medium of claim 1, further comprising instructions that cause the one or more processing units to:

receive air traffic control instructions; and generate the taxiing path plan based on the received air traffic control instructions.

9. The computer-readable medium of claim 8, wherein the air traffic control instructions are received via a communication relay from the aircraft.

10. The computer-readable medium of claim 1, further comprising instructions that cause the one or more processing units to generate an updated taxiing path plan while the aircraft is taxiing according to the taxiing path plan, and wherein the updated taxiing path plan includes an updated sequence of waypoints.

11. The computer-readable medium of claim 10, further comprising instructions that cause the one or more processing units to generate the updated taxiing path plan based on instructions from air traffic control.

12. The computer-readable medium of claim 10, further comprising instructions that cause the one or more processing units to generate the updated taxiing path plan based on detection of objects in the path of the aircraft while the aircraft is taxiing according to the taxiing path plan.

13. A non-transitory computer-readable medium comprising computer-executable instructions, the computer-executable instructions causing one or more processing units of an aircraft to:

acquire an airport map that includes a plurality of edge data structures, each of the edge data structures including a plurality of waypoints and membership data that indicates a location at an airport;

access a sequence of membership transitions associated with the membership data, the membership transitions configured to indicate a sequence of edges satisfying a membership rule for the plurality of edge data structures;

access geometry information of at least one edge transition between edge data structures;

receive a starting location and a starting heading of the aircraft at the airport;

determine a destination location and a destination heading for the aircraft at the airport;

generate a taxiing path plan for the aircraft based on the airport map, the starting location, the starting heading, the destination location, the sequence of membership transitions, the geometry information associated with the at least one edge transition, and the destination heading, wherein the taxiing path plan includes a sequence of waypoints from the edge data structures; and execute the taxiing path plan by following the sequence of waypoints in the taxiing path plan.

14. The computer-readable medium of claim 13, wherein the membership data for an edge data structure specifies a runway name, a taxiway name, or a non-movement area.

15. The computer-readable medium of claim 13, further comprising instructions that cause the one or more processing units to determine the starting location and the starting heading based on sensor data from sensors on the aircraft.

16. The computer-readable medium of claim 13, further comprising instructions that cause the one or more processing units to generate the taxiing path plan using a shortest path algorithm.

17. The computer-readable medium of claim 13, wherein the taxiing path plan includes one or more stop points that each indicate a required location for the aircraft to stop during taxiing.

18. The computer-readable medium of claim 13, wherein the taxiing path plan includes one or more optional stop points that each indicate a preset location at which the aircraft can be optionally stopped by a human operator.

19. The computer-readable medium of claim 13, wherein a plurality of the edge data structures include Boolean values that indicate whether the edge can be used for the taxiing path plan.

20. The computer-readable medium of claim 13, further comprising instructions that cause the one or more processing units to:

receive air traffic control instructions; and generate the taxiing path plan based on the received air traffic control instructions.

21. The computer-readable medium of claim 20, wherein the air traffic control instructions are received as voice instructions from an air traffic control tower, and wherein the computer-executable instructions cause the one or more processing units to:

generate text from the voice instructions; and generate the taxiing path plan based on the generated text.

22. The computer-readable medium of claim 13, further comprising instructions that cause the one or more processing units to generate an updated taxiing path plan while the aircraft is taxiing according to the taxiing path plan, and wherein the updated taxiing path plan includes an updated sequence of waypoints.

23. The computer-readable medium of claim 22, further comprising instructions that cause the one or more processing units to generate the updated taxiing path plan based on instructions from air traffic control.

24. The computer-readable medium of claim 22, further comprising instructions that cause the one or more processing units to generate the updated taxiing path plan based on detection of objects in the path of the aircraft while the aircraft is taxiing according to the taxiing path plan.

* * * * *